United States Patent
Ma et al.

(10) Patent No.: US 12,143,224 B2
(45) Date of Patent: Nov. 12, 2024

(54) HYBRID AUTOMATIC REPEAT REQUEST (HARQ) PROCESS TYPE CONFIGURATION

(71) Applicant: QUALCOMM Incorporated, San Diego, CA (US)

(72) Inventors: Liangping Ma, San Diego, CA (US); Xiao Feng Wang, San Diego, CA (US); Huilin Xu, Temecula, CA (US); Ayan Sengupta, San Diego, CA (US); Alberto Rico Alvarino, San Diego, CA (US); Jun Ma, San Diego, CA (US); Peter Gaal, San Diego, CA (US); Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 17/451,749

(22) Filed: Oct. 21, 2021

(65) Prior Publication Data

US 2022/0131653 A1   Apr. 28, 2022

Related U.S. Application Data

(60) Provisional application No. 63/104,434, filed on Oct. 22, 2020.

(51) Int. Cl.
*H04L 5/00* (2006.01)
*H04L 1/1812* (2023.01)
(Continued)

(52) U.S. Cl.
CPC .......... *H04L 1/1819* (2013.01); *H04L 5/0053* (2013.01); *H04W 72/1263* (2013.01); *H04W 72/23* (2023.01)

(58) Field of Classification Search
CPC ... H04L 1/1819; H04L 5/0053; H04L 1/1854; H04W 72/1263; H04W 72/23
See application file for complete search history.

(56) References Cited

U.S. PATENT DOCUMENTS

| | | | |
|---|---|---|---|
| 2017/0126300 A1* | 5/2017 | Park | H04L 5/0048 |
| 2019/0053235 A1* | 2/2019 | Novlan | H04L 7/0008 |

(Continued)

FOREIGN PATENT DOCUMENTS

| | | | | |
|---|---|---|---|---|
| WO | WO-2014092619 A1 * | 6/2014 | | H04L 1/1812 |
| WO | WO-2019032882 A1 * | 2/2019 | | H04B 7/0695 |

(Continued)

OTHER PUBLICATIONS

3GPP TSG RAN WG1#86, R1-166229 Title: Clearification on HARQ feedback under TDD-FDD CA in Rel-12 (Year: 2016).*

(Continued)

*Primary Examiner* — Faruk Hamza
*Assistant Examiner* — Abusayeed M Haque
(74) *Attorney, Agent, or Firm* — Patterson & Sheridan LLP

(57) ABSTRACT

Certain aspects of the present disclosure provide techniques for providing feedback. For example, a user equipment (UE) may receive, from a network node, a configuration of a search space comprising time and frequency resources available to the network node for communicating a downlink control channel, the configuration indicating a feedback process type corresponding to the search space. The UE may also receive, from the network node, the downlink control channel in the search space. The UE may also receive a downlink transmission scheduled by the downlink control channel. The UE may selectively provide feedback to the (Continued)

network node regarding decoding of the downlink transmission according to the feedback process type corresponding to the search space.

32 Claims, 15 Drawing Sheets

(51) Int. Cl.
*H04L 1/1829* (2023.01)
*H04W 72/1263* (2023.01)
*H04W 72/23* (2023.01)

(56) References Cited

U.S. PATENT DOCUMENTS

| | | | |
|---|---|---|---|
| 2019/0059101 A1* | 2/2019 | Jiang | H04W 24/10 |
| 2019/0132814 A1* | 5/2019 | Jiang | G01S 13/765 |
| 2019/0166617 A1* | 5/2019 | Park | H04W 72/0446 |
| 2020/0259625 A1* | 8/2020 | Papasakellariou | H04B 7/0456 |
| 2020/0344012 A1* | 10/2020 | Karaki | H04L 1/1861 |
| 2020/0351697 A1* | 11/2020 | Wang | H04W 52/0261 |
| 2021/0075571 A1* | 3/2021 | Manolakos | H04W 72/23 |
| 2021/0099980 A1* | 4/2021 | Khoshnevisan | H04W 72/23 |
| 2021/0100013 A1* | 4/2021 | Khoshnevisan | H04L 1/0061 |
| 2021/0127420 A1* | 4/2021 | Lu | H04W 74/0808 |
| 2021/0376936 A1* | 12/2021 | Seyedi | H04B 10/67 |
| 2021/0392525 A1* | 12/2021 | Kaikkonen | H04B 7/0695 |
| 2022/0295589 A1* | 9/2022 | Tsai | H04B 17/309 |

FOREIGN PATENT DOCUMENTS

| | | | | |
|---|---|---|---|---|
| WO | WO-2020093016 A1 * | 5/2020 | | H04L 1/1819 |
| WO | WO-2021028008 A1 * | 2/2021 | | H04L 1/0003 |
| WO | WO-2021189213 A1 * | 9/2021 | | |

OTHER PUBLICATIONS

3GPP TSG RAN WG1 Meeting 90bis, R1-1718191 Title: Remaining Issues on Feedback Design for CSI Type I and Type II (Year: 2017).*

Apple: "On HARQ Enhancements for NTN", 3GPP Draft, 3GPP TSG RAN WG1 #102-e, R1-2006521, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051918087, 3 Pages, Retrieved from the Internet: URL: https://ftp.3gpp.org/tsg_ran/WG1_RL1/TSGR1_102-e/Docs/R1-2006521.zip R1-2006521 On HARQ Enhancements for NTN.docx. [Retrieved on Aug. 8, 2020], The Whole Document.

International Search Report and Written Opinion—PCT/US2021/056292—ISA/EPO—Feb. 24, 2022.

Samsung: "On Enhancements on HARQ", 3GPP Draft, 3GPP TSG RAN WG1 #102-e, R1-2006146, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), XP051915203, 4 Pages, Retrieved from the Internet: URL: https://ftp.3gpp.org/tsg_ran/WG1_RL1/TSGR1_102-e/Docs/R1-2006146.zip R1-2006146 On Enhancements on HARQ.DOCX [Retrieved on Aug. 7, 2020] The Whole Document.

* cited by examiner

400

Starting index

Periodicity=4

Cell-Specific Configuration 502: | E | D | D | F | E | D | D | F | E | D | D | F |

UE-Specific Configuration 504: | E | D | E | | D | D |

Final Configuration 506: | E | D | D | E | D | E | D | D | D | D | D | F |

FIG. 5

HYBRID AUTOMATIC REPEAT REQUEST (HARQ) PROCESS TYPE CONFIGURATION

CROSS-REFERENCE TO RELATED APPLICATIONS

This application claims the benefit of and priority to U.S. Provisional Application No. 63/104,434, filed Oct. 22, 2020, which is assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for a hybrid automatic repeat request (HARQ) process type configuration.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable spectral efficiencies for uplink and/or downlink channels in connection with a feedback process.

Certain aspects are directed to a user equipment (UE) configured to communicate feedback, comprising a memory and a processor coupled to the memory. In some examples, the processor and the memory are configured to receive, from a network node, downlink control information (DCI) via a downlink control channel, an encoding of the DCI being associated with a feedback process type. In some examples, the processor and the memory are configured to receive a downlink transmission scheduled by the DCI. In some examples, the processor and the memory are configured to transmit feedback to the network node regarding decoding of the downlink transmission according to the feedback process type associated with the encoding of the DCI.

Certain aspects are directed to a method of communicating feedback by a user equipment (UE). In some examples, the method includes receiving, from a network node, downlink control information (DCI) via a downlink control channel, an encoding of the DCI being associated with a feedback process type. In some examples, the method includes receiving a downlink transmission scheduled by the DCI. In some examples, the method includes transmitting feedback to the network node regarding decoding of the downlink transmission according to the feedback process type associated with the encoding of the DCI.

Certain aspects are directed to a user equipment (UE). In some examples, the UE includes means for receiving, from a network node, downlink control information (DCI) via a downlink control channel, and encoding of the DCI being associated with a feedback process type. In some examples, the UE includes means for receiving a downlink transmission scheduled by the DCI. In some examples, the UE includes means for transmitting feedback to the network node regarding decoding of the downlink transmission according to the feedback process type associated with the encoding of the DCI.

Certain aspects are directed to a computer-readable medium including instructions that, when executed by at least one processor of a user equipment (UE), cause the at least one processor to perform operations. In some examples, the operations include receiving, from a network node, downlink control information (DCI) via a downlink control channel, an encoding of the DCI being associated with a feedback process type. In some examples, the operations include receiving a downlink transmission scheduled by the DCI. In some examples, the operations include transmitting feedback to the network node regarding decoding of the downlink transmission according to the feedback process type associated with the encoding of the DCI.

Certain aspects are directed to a base station (BS) configured for wireless communication, comprising a memory and a processor coupled to the memory. In some examples, the processor and the memory are configured to transmit, to a user equipment (UE), a configuration of a search space comprising time and frequency resources available to the network node for communicating downlink control information (DCI) via a downlink control channel, the configuration indicating a feedback process type corresponding to one or more of the search space or an encoding of the DCI. In some examples, the processor and the memory are configured to transmit, to the UE, the DCI in the search space. In some examples, the processor and the memory are configured to transmit, to the UE, a downlink transmission scheduled by the DCI. In some examples, the processor and the memory are configured to receive, from the UE, feedback regarding decoding of the downlink transmission according to the feedback process type corresponding to one or more of the search space or the encoding of the DCI.

Certain aspects are directed to a method for wireless communication by a base station (BS). In some examples, the method includes transmitting, to a user equipment (UE), a configuration of a search space comprising time and frequency resources available to the network node for communicating downlink control information (DCI) via a downlink control channel, the configuration indicating a feedback process type corresponding to one or more of the search space or an encoding of the DCI. In some examples, the method includes transmitting, to the UE, the DCI in the search space. In some examples, the method includes transmitting, to the UE, a downlink transmission scheduled by the DCI. In some examples, the method includes receiving, from the UE, feedback regarding decoding of the downlink transmission according to the feedback process type corresponding to one or more of the search space or the encoding of the DCI.

Certain aspects are directed to a base station (BS). In some examples, the BS includes means for transmitting, to a user equipment (UE), a configuration of a search space comprising time and frequency resources available to the network node for communicating downlink control information (DCI) via a downlink control channel, the configuration indicating a feedback process type corresponding to one or more of the search space or an encoding of the DCI. In some examples, the BS includes means for transmitting, to the UE, the DCI in the search space. In some examples, the BS includes means for transmitting, to the UE, a downlink transmission scheduled by the DCI. In some examples, the BS includes means for receiving, from the UE, feedback regarding decoding of the downlink transmission according to the feedback process type corresponding to one or more of the search space or the encoding of the DCI.

Certain aspects are directed to a computer-readable medium including instructions that, when executed by at least one processor of a base station (BS), cause the at least one processor to perform operations. In some examples, the operations include transmitting, to a user equipment (UE), a configuration of a search space comprising time and frequency resources available to the network node for communicating downlink control information (DCI) via a downlink control channel, the configuration indicating a feedback process type corresponding to one or more of the search space or an encoding of the DCI. In some examples, the operations include transmitting, to the UE, the DCI in the search space. In some examples, the operations include transmitting, to the UE, a downlink transmission scheduled by the DCI. In some examples, the operations include receiving, from the UE, feedback regarding decoding of the downlink transmission according to the feedback process type corresponding to one or more of the search space or the encoding of the DCI.

Certain aspects of the subject matter described in this disclosure can be implemented in a method for wireless communication by a user equipment (UE). The method generally includes receiving, from a network node, a configuration of a search space comprising time and frequency resources available to the network node for communicating a downlink control channel, the configuration indicating a feedback process type corresponding to the search space. The method also includes receiving, from the network node, the downlink control channel in the search space. The method also includes receiving a downlink transmission scheduled by the downlink control channel. The method also includes selectively providing feedback to the network node regarding decoding of the downlink transmission according to the feedback process type corresponding to the search space.

Certain aspects of the subject matter described in this disclosure can be implemented in a method for wireless communication by a user equipment (UE). The method generally includes receiving, from a network node, configuration information for a set of time periods, the configuration information indicating, for each time period in the set of time periods, a corresponding feedback process type of a plurality of feedback process types. The method also includes receiving a downlink transmission during a first time period of the set of time periods. The method also includes selectively providing feedback to the network node regarding decoding of the downlink transmission according to the corresponding feedback process type of the first time period.

Certain aspects of the subject matter described in this disclosure can be implemented in an apparatus for wireless communication. The apparatus generally includes a memory and a processor communicatively coupled to the memory. The memory and the processor are generally configured to receive, from a network node, a configuration of a search space comprising time and frequency resources available to the network node for communicating a downlink control channel, the configuration indicating a feedback process type corresponding to the search space. The memory and the processor are generally configured to receive, from the network node, the downlink control channel in the search space. The memory and the processor are generally configured to receive a downlink transmission scheduled by the downlink control channel. The memory and the processor are generally configured to selectively provide feedback to the network node regarding decoding of the downlink transmission according to the feedback process type corresponding to the search space.

Certain aspects of the subject matter described in this disclosure can be implemented in an apparatus for wireless communication. The apparatus generally includes a memory and a processor communicatively coupled to the memory. The memory and the processor are generally configured to receive, from a network node, configuration information for a set of time periods, the configuration information indicating, for each time period in the set of time periods, a corresponding feedback process type of a plurality of feedback process types. The memory and the processor are generally configured to receive a downlink transmission during a first time period of the set of time periods. The memory and the processor are generally configured to selectively provide feedback to the network node regarding decoding of the downlink transmission according to the corresponding feedback process type of the first time period.

Certain aspects of the subject matter described in this disclosure can be implemented in an apparatus for wireless communication. The apparatus generally includes means for receiving, from a network node, a configuration of a search space comprising time and frequency resources available to the network node for communicating a downlink control channel, the configuration indicating a feedback process type corresponding to the search space. The apparatus generally includes means for receiving, from the network node, the downlink control channel in the search space. The apparatus generally includes means for receiving a downlink transmission scheduled by the downlink control channel. The apparatus generally includes means for selectively providing feedback to the network node regarding decoding of the downlink transmission according to the feedback process type corresponding to the search space.

Certain aspects of the subject matter described in this disclosure can be implemented in an apparatus for wireless communication. The apparatus generally includes means for receiving, from a network node, configuration information for a set of time periods, the configuration information indicating, for each time period in the set of time periods, a corresponding feedback process type of a plurality of feedback process types. The apparatus generally includes means for receiving a downlink transmission during a first time period of the set of time periods. The apparatus generally includes means for selectively providing feedback to the network node regarding decoding of the downlink transmission according to the corresponding feedback process type of the first time period.

Certain aspects of the subject matter described in this disclosure can be implemented in a computer readable medium having instructions stored thereon that when executed by a UE cause the UE to perform a method of communicating feedback. The method generally includes receiving, from a network node, a configuration of a search space comprising time and frequency resources available to the network node for communicating a downlink control channel, the configuration indicating a feedback process type corresponding to the search space. The method generally includes receiving, from the network node, the downlink control channel in the search space. The method generally includes receiving a downlink transmission scheduled by the downlink control channel. The method generally includes selectively providing feedback to the network node regarding decoding of the downlink transmission according to the feedback process type corresponding to the search space.

Certain aspects of the subject matter described in this disclosure can be implemented in a computer readable medium having instructions stored thereon that when executed by a UE cause the UE to perform a method of communicating feedback. The method generally includes receiving, from a network node, configuration information for a set of time periods, the configuration information indicating, for each time period in the set of time periods, a corresponding feedback process type of a plurality of feedback process types. The method generally includes receiving a downlink transmission during a first time period of the set of time periods. The method generally includes selectively providing feedback to the network node regarding decoding of the downlink transmission according to the corresponding feedback process type of the first time period.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 illustrates an example of replacing a feedback type in occasions of a pattern, according to certain aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
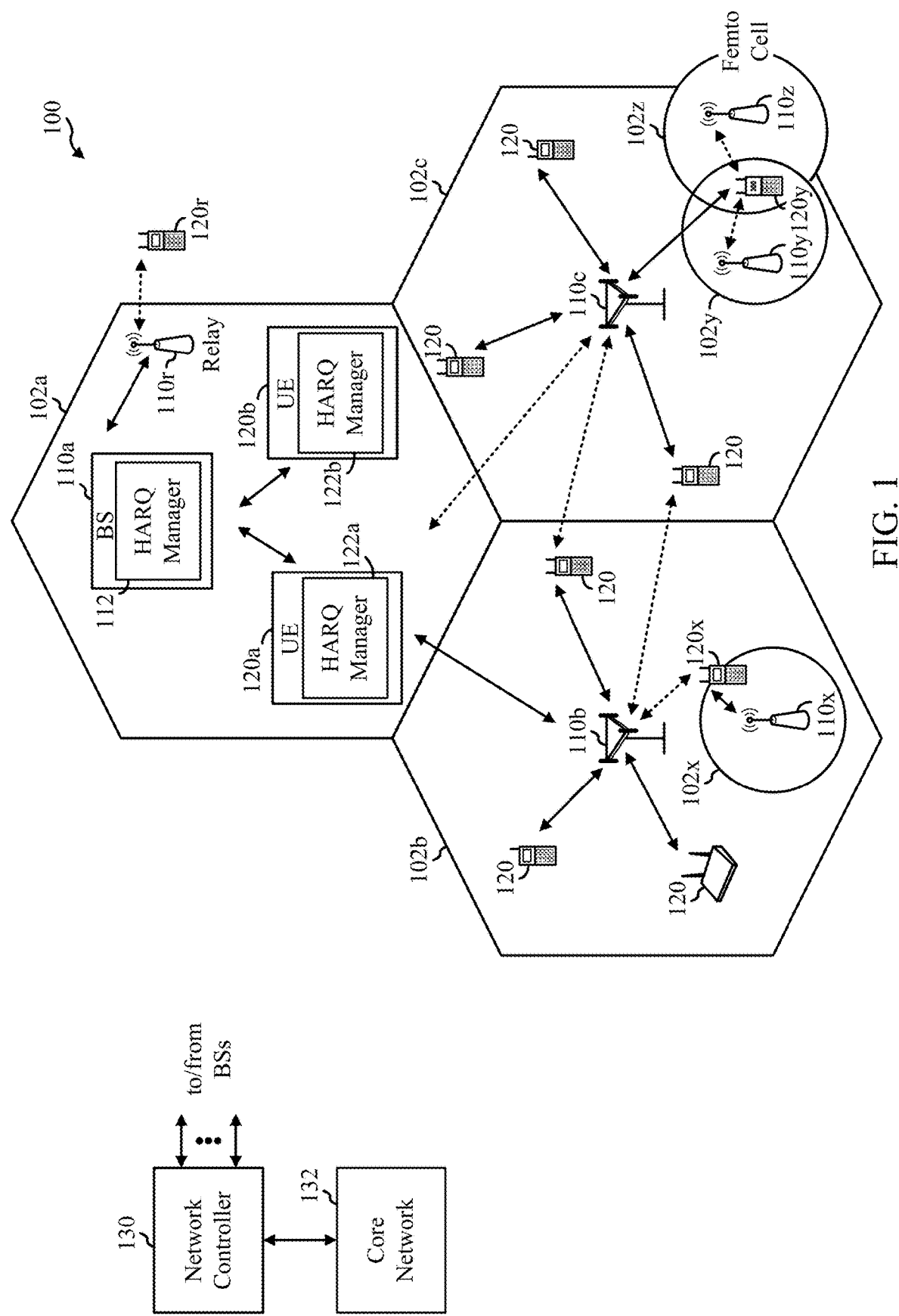
FIG. 1 is a block diagram conceptually illustrating an example wireless communication network, in accordance with certain aspects of the present disclosure.

Aspects of the present disclosure provide apparatus, methods, processing systems, and computer readable mediums for configuring a feedback process type at a device, such as a user equipment (UE). Certain aspects are described herein with respect to a hybrid automatic repeat request (HARQ) process for feedback, however, it should be noted that the techniques may be similarly applicable to other suitable feedback processes.

In certain aspects, a UE is configured to provide feedback to a transmitting device (e.g., a base station (BS)), indicating whether the UE has successfully received and decoded a transmission sent from the transmitting device. In certain aspects, the feedback is one or more of an acknowledgement (ACK) indicating the UE has successfully received and decoded the transmission and/or a negative ACK (NACK) indicating the UE has not successfully received and decoded the transmission. In certain aspects (e.g., for a HARQ process with feedback enabled as discussed herein), a UE transmits an ACK when it has successfully received and decoded the transmission and refrains from transmitting an ACK when it has not successfully received and decoded the transmission. In certain aspects (e.g., for a HARQ process with feedback enabled as discussed herein), a UE transmits a NACK when it has not successfully received and decoded the transmission and refrains from transmitting a NACK when it has successfully received and decoded the transmission. In certain aspects (e.g., for a HARQ process with feedback enabled as discussed herein), a UE transmits an ACK when it has successfully received and decoded the transmission and transmits a NACK when it has not successfully received and decoded the transmission.

In certain aspects, a UE is configured with one or more HARQ processes. Accordingly, in certain aspects, the UE maintains one or more buffers, each buffer corresponding to one of the one or more HARQ processes. Each HARQ process may be used for buffering data for a given downlink channel (e.g., control channel such as a physical downlink control channel (PDCCH) or a data channel such as a physical downlink shared channel (PDSCH)) at a time (e.g., per subframe, slot, etc.). In particular, as part of a HARQ process, the UE buffers data that is received even if it cannot successfully decode the data, and informs the BS that it could not decode the data for that channel for that time period. The BS may then resend the data to the UE, and the UE may then use both the previously received data and the resent data in combination (e.g., soft combining) to attempt to decode the data. Accordingly, different HARQ processes of the UE may be assigned to different downlink channels/downlink occasions at a time, and used to try and successfully receive and decode data. Each HARQ process may be identified by an identifier referred to as a HARQ ID, so that the receiver and transmitter are aware of which data belongs to which HARQ process.

In certain cases, the feedback for a HARQ process (e.g. associated with a particular downlink channel occasion) may be disabled. For example, in a non-terrestrial network (NTN) where a UE communicates with a BS that is a satellite, the round-trip-time/propagation delay for communicating between the UE and the BS may be large. Therefore, with HARQ feedback enabled, there may be long delays between communications between the UE and the BS, such as long delays between when a BS sends a transmission and when a BS receives feedback from the UE for the transmission. Such delays may cause a stop-and-wait problem, where the BS must wait for the UE to confirm it has decoded a first transmission before it can further send data for a second transmission, thereby causing a slow rate of data transfer between the BS and the UE. In certain aspects, it may be more beneficial to enable HARQ feedback for some transmissions (e.g., control channel transmissions such as medium access control (MAC) control element (MAC CE) transmissions to ensure reliability), while HARQ feedback may not be enabled for other transmissions.

Certain aspects herein provide for different feedback process types, such as different HARQ process types. Certain aspects provide a feedback enabled type, such as HARQ feedback enabled. If the feedback process type is feedback enabled type for a particular HARQ process, in certain aspects, the UE is configured to transmit HARQ feedback (e.g., ACK/NACK) to the transmitting device for the downlink channel the HARQ process is associated with, such as discussed. The transmitting device may then wait for such feedback and resend data as needed per the HARQ process.

Certain aspects provide a feedback disabled type, such as HARQ feedback disabled. If the feedback process type is feedback disabled type for a particular HARQ process, in certain aspects, the UE is configured to not transmit feedback to the transmitting device for the downlink channel the HARQ process is associated with. Accordingly, the transmitting device is not configured to wait for any such feedback, and may continue sending data to the UE.

In certain aspects, such as for conforming to legacy devices that expect feedback to be sent, even for a HARQ process configured as feedback disabled type for a UE, the UE is configured to always send a NACK to the transmitting device for the downlink channel the HARQ process is associated with, regardless of whether the data was successfully received or not. The transmitting device simply ignores such feedback and may not wait for such feedback and continue sending data to the UE, which differs from feedback enabled type.

In certain aspects, such as for conforming to legacy devices that expect feedback to be sent, even for a HARQ process configured as feedback disabled type for a UE, the UE is configured to send ACK or NACK to the transmitting device for the downlink channel the HARQ process is associated with, depending on whether the data was successfully received or not. The transmitting device, however, may not wait for such feedback, and may not even utilize such feedback in determining to resend data to the UE, and continues sending data to the UE, which differs from feedback enabled type.

Certain aspects provide a feedback flexible type, such as HARQ feedback flexible. Such a flexible type can be dynamically configured to be used as a feedback enabled type or a feedback disabled type using signaling as discussed herein.

In certain aspects, the format of downlink control information (DCI) used for different feedback process types may be different. For example, in certain aspects, the downlink assignment index (DAI) fields may not be present in DCI for HARQ processes of feedback disabled type, while the DAI fields may be present in DCI for HARQ processes of feedback enabled type.

Accordingly, certain aspects herein provide efficient techniques for configuring feedback process type for a feedback process. For example, certain aspects configure feedback process type for a feedback process based on a search space in which a control channel is sent for the data channel transmitted by the feedback process.

In certain aspects, a network node (e.g., BS) configures the feedback process type for particular time periods (e.g., slots, downlink transmission occasions (e.g., physical downlink shared channel (PDSCH) occasions), etc.) in which data channel transmissions may be communicated. Accordingly, the feedback process type of a HARQ process in which a data channel transmission is transmitted is based on the time period in which the data channel transmission is transmitted. In certain aspects, the BS may configure the feedback process type for a particular time period to apply to all UEs served by the BS. In certain aspects, the BS may configure the feedback process type for a particular time period to apply to a particular UE served by the BS. In certain aspects, if the BS configures the feedback process type for a particular time period to apply to all UEs served by the BS to be of one feedback process type, and the BS further configures the feedback process type for a particular time period to apply to a particular UE to be of a second feedback process type, the UE utilizes the second feedback process type.

The following description provides examples of feedback process type configuration in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported, as multi-layer transmissions. Aggregation of multiple cells may be supported.

FIG. 1 illustrates an example wireless communication network 100 in which aspects of the present disclosure may be performed. For example, the wireless communication network 100 may be an NR system (e.g., a 5G NR network).

As shown in FIG. 1, the BS 110a includes a HARQ manager 112 that may transmit signaling for feedback process type configuration of one or more HARQ processes of a UE (such as the UE 120a or 120b), in accordance with aspects of the present disclosure. The UE 120a includes a HARQ manager 122a that may receive signaling for feedback process type configuration of one or more HARQ processes and communicate feedback to the BS based on the feedback process type configuration, in accordance with aspects of the present disclosure. The UE 120b may also include a HARQ manager 122b. In aspects, the BS 110a may transmit multicast/broadcast transmissions concurrently to the UEs 120a, 120b, for example. A common feedback process type configuration may be sent to the UEs 120a, 120b. While the transmissions between the BS 110a and UEs 120a, 120b are depicted as being separate transmissions to facilitate understanding, aspects of the present disclosure may also be applied to the same multicast/broadcast transmission being sent between the BS 110a and UEs 120a, 120b.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
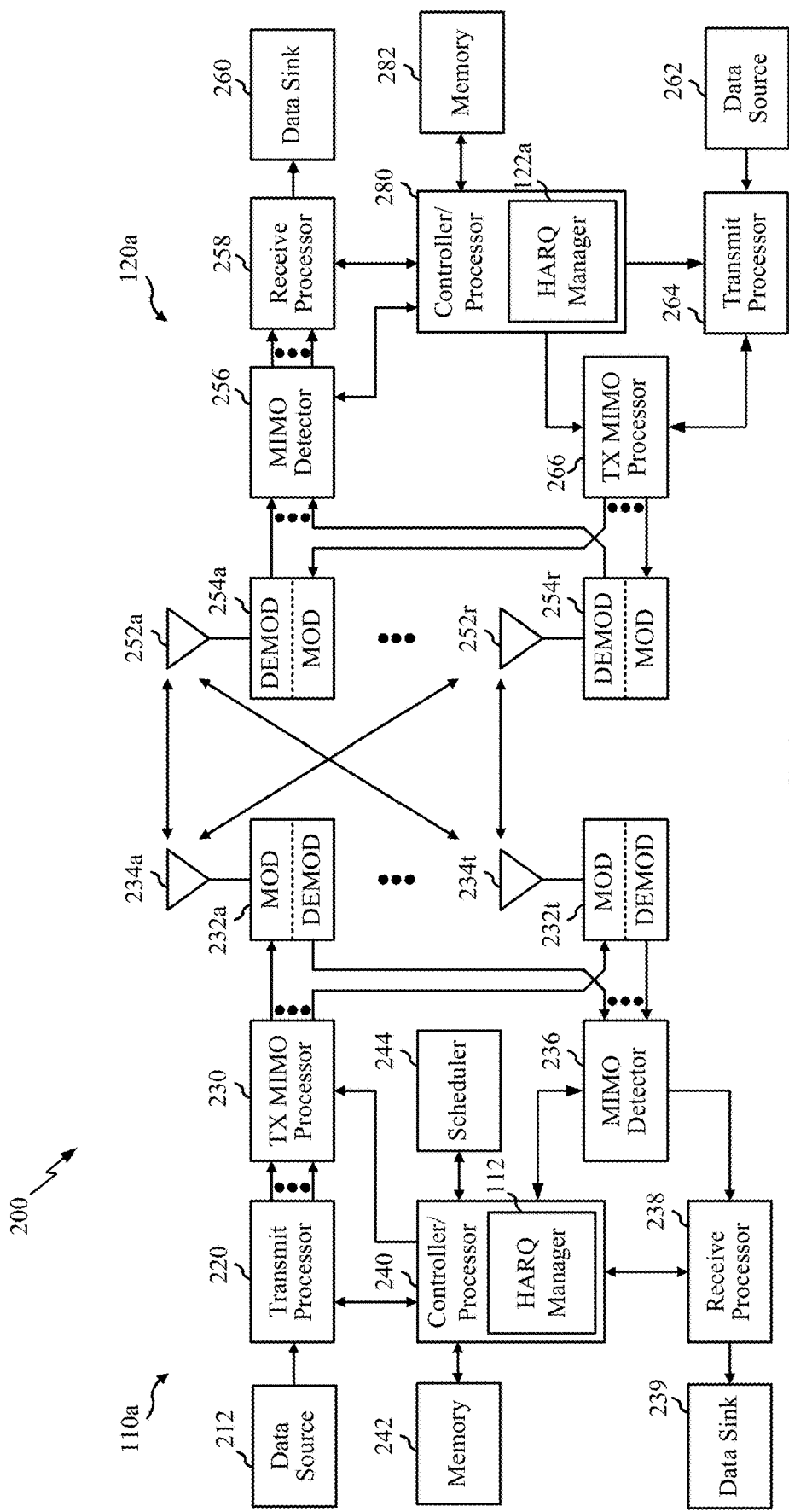
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has the HARQ manager 112, according to aspects described herein. As shown in FIG. 2, the controller/processor 280 of the UE 120a has the HARQ manager 122a, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless communication device without relaying communications through a network. In some embodiments, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
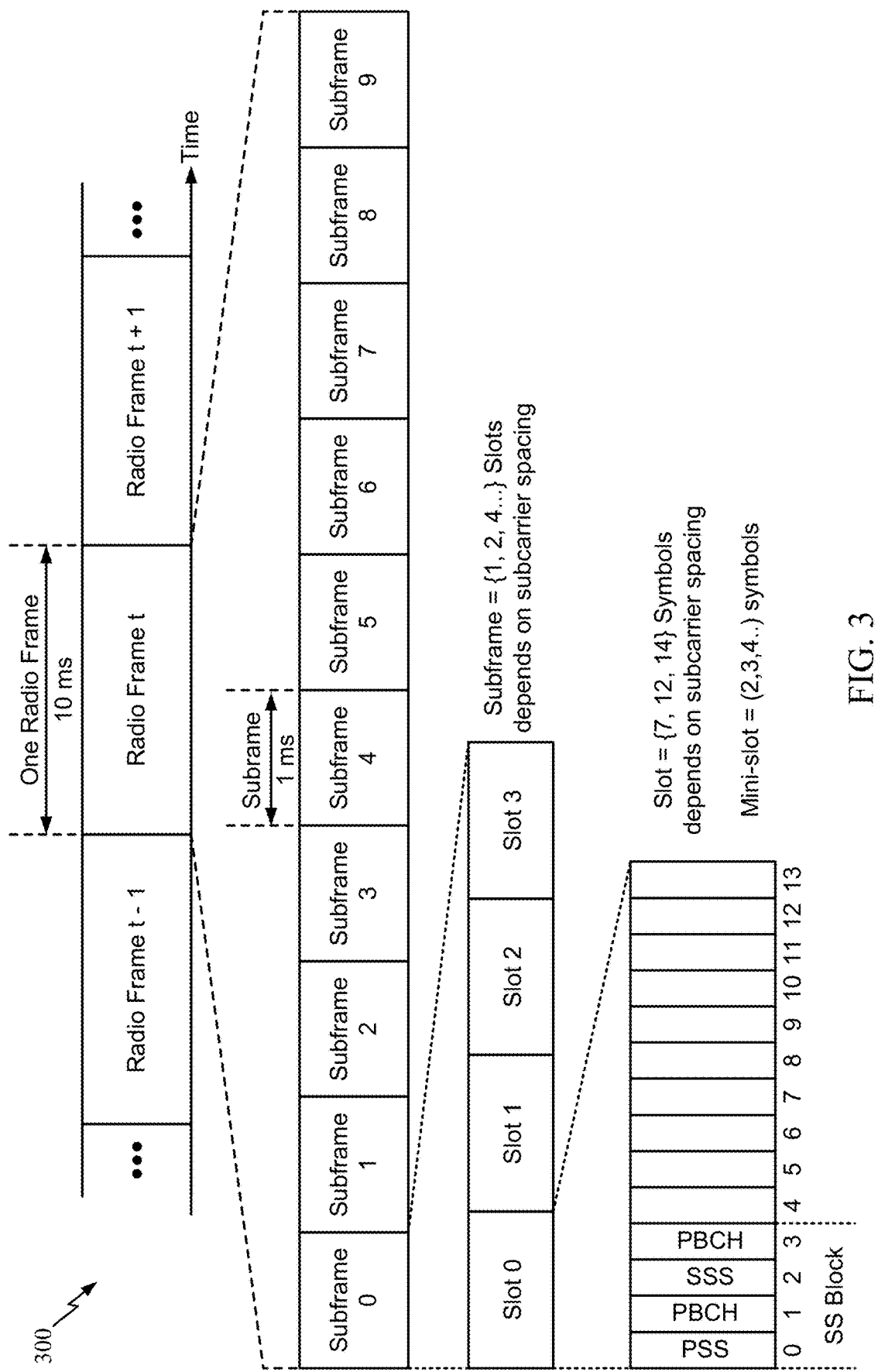
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIB s), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example Feedback Process Type Configuration

In certain cases, a wireless communication network may support transmission of data with hybrid automatic repeat request (HARD) to provide forward error correction in addition to automatic re-transmission of corrupted data at a receiver. For example, a transmitter (e.g., the BS 110a) may send an initial transmission of data to a receiver (e.g., a UE), and if the data is corrupted at the receiver, the transmitter may send one or more retransmissions of the data (such as a transport block (TB), codeblock group (CBG), or one or more codeblocks) until the data is successfully decoded at the receiver, or the maximum number of retransmissions of the data has occurred, or some other termination condition is encountered.

As re-transmissions are received, the receiver may combine all of the received transmissions (including the initial transmission and re-transmissions) to attempt to decode the data. In certain cases, the receiver may send an acknowledgment (ACK) if the data is decoded successfully or a negative-ACK (NACK) if the data is decoded in error or unsuccessfully. The transmitter may send a re-transmission of the data if a NACK is received and may terminate transmission of the data if an ACK is received. In certain cases, the transmitter may send a re-transmission if the transmitter fails to receive an ACK within a certain period of time. The transmitter may process (e.g., encode and modulate) the data with forward error correction and/or redundancy information, which may be selected such that the data can be decoded successfully with a high probability. The data may also be referred to as a TB, a codeword, a data block, etc. In certain cases, a data transmission (e.g., a transport block) may be segmented into codeblocks (CBs), and re-transmissions may be triggered on a CBG basis (e.g., a group of codeblocks). A re-transmission may be a same or a different redundancy version of a segmented data transmission.

As discussed, in certain aspects, a UE utilizes one or more HARQ processes for providing feedback for one or more transmissions of data (such as a transport block (TB), codeblock group (CBG), or one or more codeblocks). Certain aspects herein provide for configuring a feedback process type for the one or more HARQ processes.

In certain aspects, a UE is configured with a search space for a downlink control channel (PDCCH) by a network. The search space may indicate resources (e.g., time/frequency resources, such as resource blocks (RBs), resource elements (REs), etc.) that are candidates for a BS to transmit a downlink control channel to the UE. In certain aspects, the BS configures the UE with a search space utilizing radio resource control (RRC) signaling, such as in a RRC message.

In certain aspects, the UE is configured to monitor (e.g., receive and attempt to decode) signals on the candidate resources indicated in the search space for the downlink control channel. The UE may receive a downlink control channel in the search space that schedules (e.g., using a downlink grant, downlink control information (DCI), etc.) a downlink data channel (e.g., PDSCH) on one or more resources (e.g., time/frequency resources, such as resource blocks (RBs), resource elements (REs), etc.). The UE may then receive the downlink data channel on the one or more resources and attempt to decode the downlink data channel. The UE may utilize a HARQ process for receiving/decoding the downlink data channel as discussed.

In certain aspects, the BS configures the UE with one or more search spaces and in the configuration indicates a feedback process type associated with each search space. Accordingly, when the UE receives a downlink control channel in a search space associated with a particular feedback process type and the downlink control channel schedule a downlink data channel, the UE determines the feedback process to use for the downlink data channel as that of the particular feedback process type. Accordingly, the UE configures the feedback process type for the feedback process of the downlink data channel to be the particular feedback process type and provides feedback for the downlink data channel to the BS accordingly.

In certain aspects, the BS includes a field in the search space configuration sent to the UE for a search space that indicates the feedback process type associated with the search space.

In certain aspects, a control channel element (CCE) aggregation level configuration used for the downlink control channel in a search space may be different for different feedback process types, meaning the CCE aggregation level configuration is specific to a feedback process type. Accordingly, in certain aspects, the UE can determine the feedback process type associated with the search space based on the CCE aggregation level associated with the search space. In certain aspects, the UE is configured (e.g., at manufacture, using signaling, etc.) with a mapping of CCE aggregation level to feedback process type.

In certain aspects, a DCI format (e.g., DCI encoding) used for the downlink control channel in a search space may be different for different feedback process types, meaning the DCI format is specific to a feedback process type. Accordingly, in certain aspects, the UE can determine the feedback process type associated with the search space based on the DCI used in the downlink control channel received in the search space. In certain aspects, the UE is configured (e.g., at manufacture, using signaling, etc.) with a mapping of DCI format to feedback process type.

In certain aspects, the encoding (e.g., format, size, etc.) of a DCI included in a downlink control channel may be different for different feedback process types, meaning the DCI encoding is specific to a feedback process type. For example, in certain aspects a size of the DCI is specific to a feedback process type. In certain aspects, a format of DCI is specific to a feedback process type. Accordingly, in certain aspects, the UE can determine the feedback process type associated with a downlink data channel based on the DCI used in the downlink control channel used to schedule the downlink data channel. In certain aspects, the UE is configured (e.g., at manufacture, using signaling, etc.) with a mapping of DCI encoding to feedback process type.

In certain aspects, the BS configures the feedback process type for feedback processes of one or more UEs for particular occasions (e.g., time periods, slots, downlink occasions (e.g., physical downlink shared channel (PDSCH) occasions), etc.) in which data channel transmissions are communicated. For example, in certain aspects, the BS sends explicit signaling to the UE indicating which particular occasions, such as slots, PDSCH occasions, etc., are associated with which particular feedback process type. Accordingly, any downlink channel transmission received in such an occasion is associated with the associated feedback process type which is used for the HARQ process for the downlink channel transmission by the UE. The UE provides feedback to the BS for the downlink channel transmission according to the associated feedback process type. In certain aspects, the BS uses one or more of a system information block (SIB), RRC message, MAC CE, etc., transmitted to the UE for configuring the feedback process type for feedback processes of one or more UEs for particular occasions.

In certain aspects, the configuration for the feedback process type sent by the BS to the UE comprises a pattern that occurs periodically that maps feedback process type to particular occasions. In certain aspects, the pattern is defined in the configuration by one or more values comprising one or more of an indication of a periodicity, a starting index number (e.g., starting slot number), and a partitioning into one or more subsets of feedback process types (e.g., feedback enabled type, feedback disabled type, and feedback flexible type). For example, the partitioning may be an indication of a first number associated with a first feedback process type, a second number associated with a second feedback process type, etc. In certain aspects, the configuration for feedback process type sent by the BS is applicable to all UEs within a cell of the BS, meaning it is cell specific. In certain aspects, the BS uses one or more of a SIB or RRC messaging (e.g., for handover) to send the configuration for feedback process type to the one or more UEs in the cell. In certain aspects, the UE is configured to use the configuration for the feedback process type sent by the BS for a particular time period (e.g., preconfigured, indicated in the configuration, indicated in other signaling, etc.). In certain aspects, the UE is configured to use the configuration for the feedback process type sent by the BS until a new configuration is received from the BS.

Figure 4:
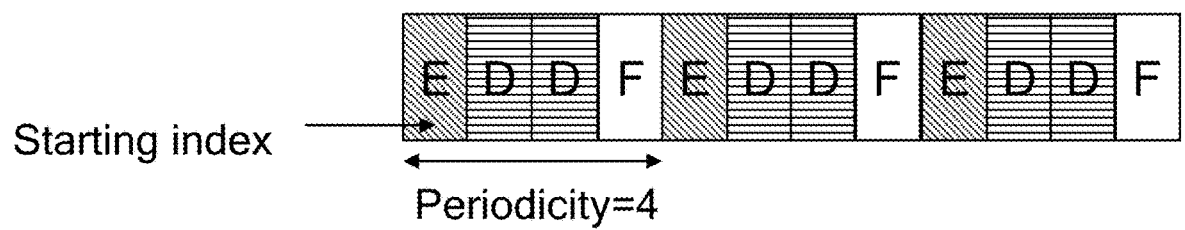
FIG. 4 illustrates an example of a pattern for feedback process type mapping to occasions, according to certain aspects.

FIG. 4 illustrates an example of a pattern 400 for feedback process type mapping to occasions, according to certain aspects. As shown, the pattern 400 starts at a first index value, e.g., corresponding to a slot number indicated in the configuration. Further, the pattern includes a first occasion (e.g., slot) starting at the first index value indicated as associated with a feedback enabled type (E), a next two occasions indicated as associated with a feedback disabled type (D), and a next occasion indicated as associated with a feedback flexible type (F). As shown, the pattern 400 has a periodicity of 4. Accordingly, the pattern EDDF repeats every 4 occasions. Thus, for example, a downlink channel received in an occasion associated with type E is associated with a feedback enabled type HARQ process.

In certain aspects, the configuration (e.g., of a pattern as discussed) for feedback process type sent by the BS is applicable to a particular UE, meaning it is UE specific. In certain aspects, the BS uses one or more of RRC messaging or a MAC CE to send the configuration for feedback process type to the UE. In certain aspects, the UE is configured to use the configuration for the feedback process type sent by the BS for a particular time period (e.g., preconfigured, indicated in the configuration, indicated in other signaling, etc.). In certain aspects, the UE is configured to use the configuration for the feedback process type sent by the BS until a new configuration is received from the BS. In certain aspects, the configuration is dependent on the traffic requirement(s) and/or quality of service (QoS) requirement(s) of the UE. In certain aspects, the configuration is applicable to downlink slots, such as in the case of TDD communications. In certain aspects, the UE specific configuration may be used independently of cell specific configuration.

In certain aspects, the UE specific configuration may be used along with cell specific configuration. In such aspects, any occasion, e.g., slot, for which a configuration is defined by only one of the cell specific configuration or the UE specific configuration is associated with the feedback process type indicated by such only one of the cell specific configuration or the UE specific configuration. Further, in certain aspects, for any occasion, e.g., slot, for which conflicting configurations (e.g., different feedback process types) are indicated for the same occasion by each of the cell specific configuration and the UE specific configuration, the UE specific configuration may override the cell specific configuration. For example, for a particular slot, if the cell specific configuration indicates type E, and the UE specific configuration indicates type D, the slot may be associated with type D.

FIG. 5 illustrates an example of aspects of a cell-specific configuration pattern being replaced with UE-specific configuration, according to certain aspects. As shown, the cell-specific configuration has an initial pattern 502 that starts at a first index value, e.g., corresponding to a slot number indicated in the configuration. Further, the pattern includes a first occasion (e.g., slot) starting at the first index value indicated as associated with a feedback enabled type (E), a next two occasions indicated as associated with a feedback disabled type (D), and a next occasion indicated as associated with a feedback flexible type (F). As shown, the initial pattern 502 has a periodicity of 4. Accordingly, the pattern EDDF repeats every 4 occasions. As shown, a UE-specific configuration has a modified pattern 504 that replaces the feedback type of five of the occasions of the initial pattern 502. Accordingly, a final configuration pattern 506 results from replacing the feedback type of certain occasions with the feedback type of the corresponding occasions of a UE-specific configuration.

In certain aspects, such as for a UE specific configuration of a pattern as discussed, the occasions may be downlink data channel (e.g., PDSCH) occasions. In certain aspects, this may provide a finer granularity of feedback process type configuration than slot level configuration, where the occasions are slots. However, unlike a time slot structure which may be shared by different UEs in a given cell of a BS, the configuration of downlink data channel occasions at different UEs in a given cell may differ, such as in number of downlink data channel occasions, distribution of resources for the downlink data channel occasions, etc. For example, the configuration of downlink data channel occasions at different UEs may depend on UE specific factors, such as a PDSCH to HARQ feedback timing relationship based on dl-DataToUL-ACK for DCI format 1_1, i.e., the K1 parameter; or a maximum number of TBs per slot, which depends on the maximum number of layers, which in turn depends on the number of UE antennas. In certain aspects, the pattern for feedback process type configuration is defined in the configuration by one or more values indicating a sequence of downlink data channel occasion indices as associated with particular feedback process types. In certain aspects, the BS uses one or more of RRC messaging or a MAC CE to send the configuration for feedback process type to the UE. In certain aspects, the configuration is dependent on the traffic and/or QoS requirements of the UE.

In certain aspects, the BS configures the UE with a number of patterns (e.g., feedback process type to time slot patterns), such as using RRC signaling. Each pattern may be defined in the configuration by a pattern index and a sequence of occasions (e.g., time periods, slots, downlink channel occasions, PDSCH occasions, etc.) as associated with a particular feedback process type (e.g., E, D, or F). For example, the BS may configure the UE with patterns according to Table 1 as follows:

TABLE 1

| Pattern index | Sequence |
|---|---|
| 0 | EEEEEEEEEE |
| 1 | DDDDDDDDDD |
| 2 | EDDFEDDFED |
| 3 | EEDDFEEDDD |
| 4 | EDDEDDDDDE |

In certain aspects, the length of the patterns (e.g., the number of pattern indices, the number of occasion indices in a pattern, etc.) is configured by the BS, such as using RRC signaling. In certain aspects, the length depends on a round-trip time between the UE and the network (e.g., BS). In certain aspects, such as where the occasions are PDSCH occasions, the length depends on a density of candidate PDSCH occasions (e.g., on average how many PDSCH occasions per slot).

In certain aspects, an action time (e.g., time delay, such as in terms of number of slots) between when the BS configures the UE to utilize a particular pattern and when the UE begins applying the configuration to the HARQ processes is configured by the BS, such as using RRC signaling.

In certain aspects, the BS configures the UE to utilize a particular pattern using signaling, such as in a DCI or a MAC CE. For example, the BS includes a pattern index in the signaling, and the UE then applies the pattern mapped to by the pattern index to the occasions to determine the feedback process type to utilize for the HARQ process for transmissions received in the occasions. In certain aspects, the UE is configured to use the pattern indicated by the pattern index to determine the feedback process type for a particular time period, such as number of slots after the action time, (e.g., preconfigured, indicated in the configuration, indicated in other signaling, etc.). In certain aspects, the UE is configured to use the configuration for the feedback process type sent by the BS until a new configuration is received from the BS. In certain aspects, the activation of a pattern index is dependent on traffic and/or QoS requirements for the UE.

Figure 6:
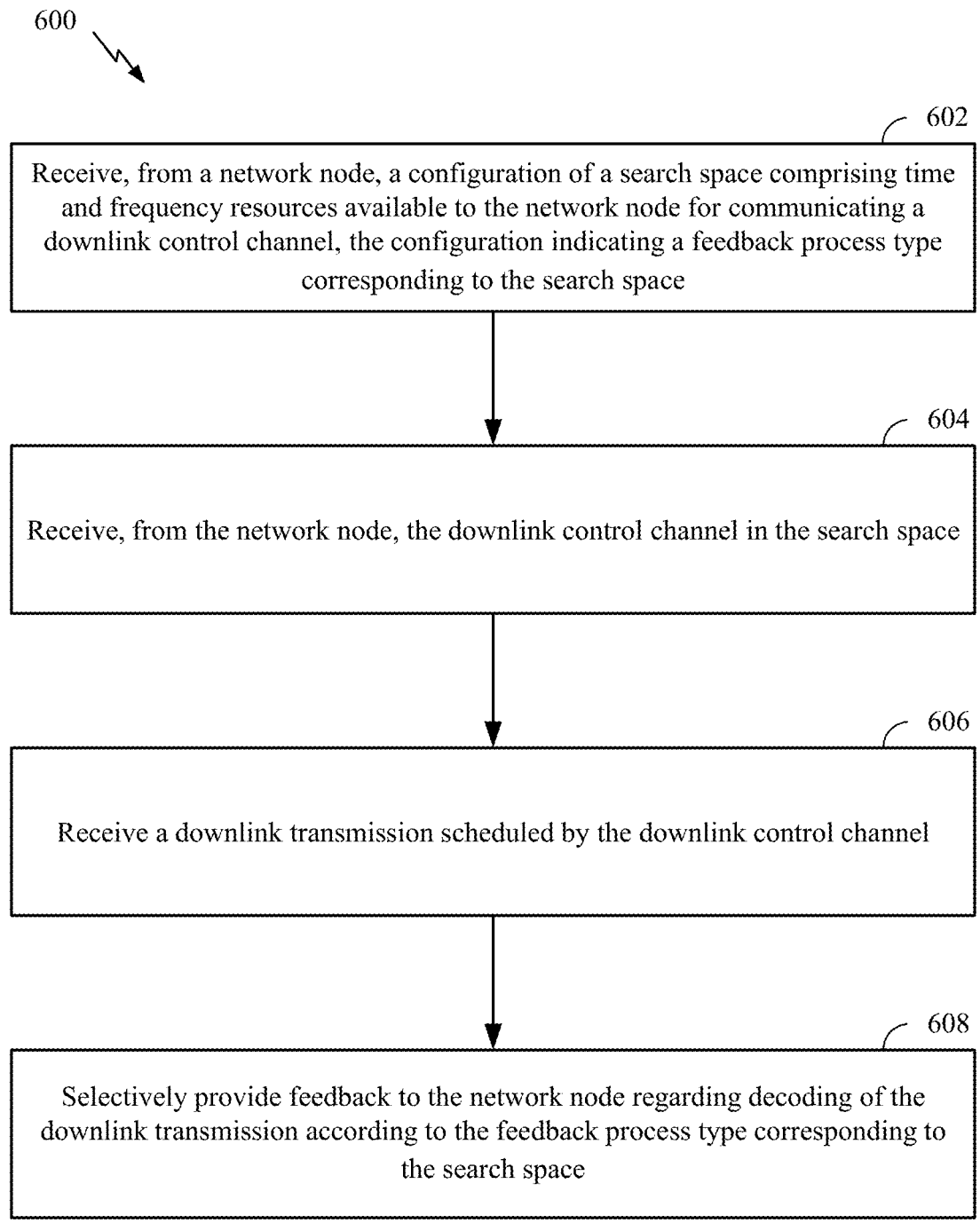
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., the UE 120a in the wireless communication network 100). The operations 600 may be implemented as software components that are executed and run on one or more processors (e.g., controller/processor 280 of FIG. 2). Further, the transmission and reception of signals by the UE in the operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 602, where the UE may receive, from a network node, a configuration of a search space comprising time and frequency resources available to the network node for communicating a downlink control channel, the configuration indicating a feedback process type corresponding to the search space. Continuing, at block 604, the UE may receive, from the network node, the downlink control channel in the search space. Further, at block 606, the UE may receive a downlink transmission scheduled by the downlink control channel. At block 608, the UE may selectively provide feedback (e.g., transmit feedback or withhold transmission of feedback) to the network node regarding decoding of the downlink transmission according to the feedback process type corresponding to the search space In certain aspects of operations 600, the configuration of the search space is received in a radio resource control (RRC) message.

In certain aspects of operations 600, the configuration indicating a feedback process type for the search space comprises the configuration including a field, and different values of the field indicate a feedback enabled type, a feedback disabled type, and a flexible feedback type.

In certain aspects of operations 600, a number of time and frequency resources available to the network node for communicating the downlink control channel is based on the feedback process type.

In certain aspects of operations 600, a format of the downlink control channel is based on the feedback process type. In certain such aspects, a control channel element (CCE) aggregation level of the downlink control channel is based on the feedback process type.

In certain aspects of operations 600, an encoding of a downlink control information (DCI) included in the downlink control channel is based on the feedback process type. In certain such aspects, the encoding of the DCI comprises one or more of a size of the DCI and a format of the DCI.

Figure 7:
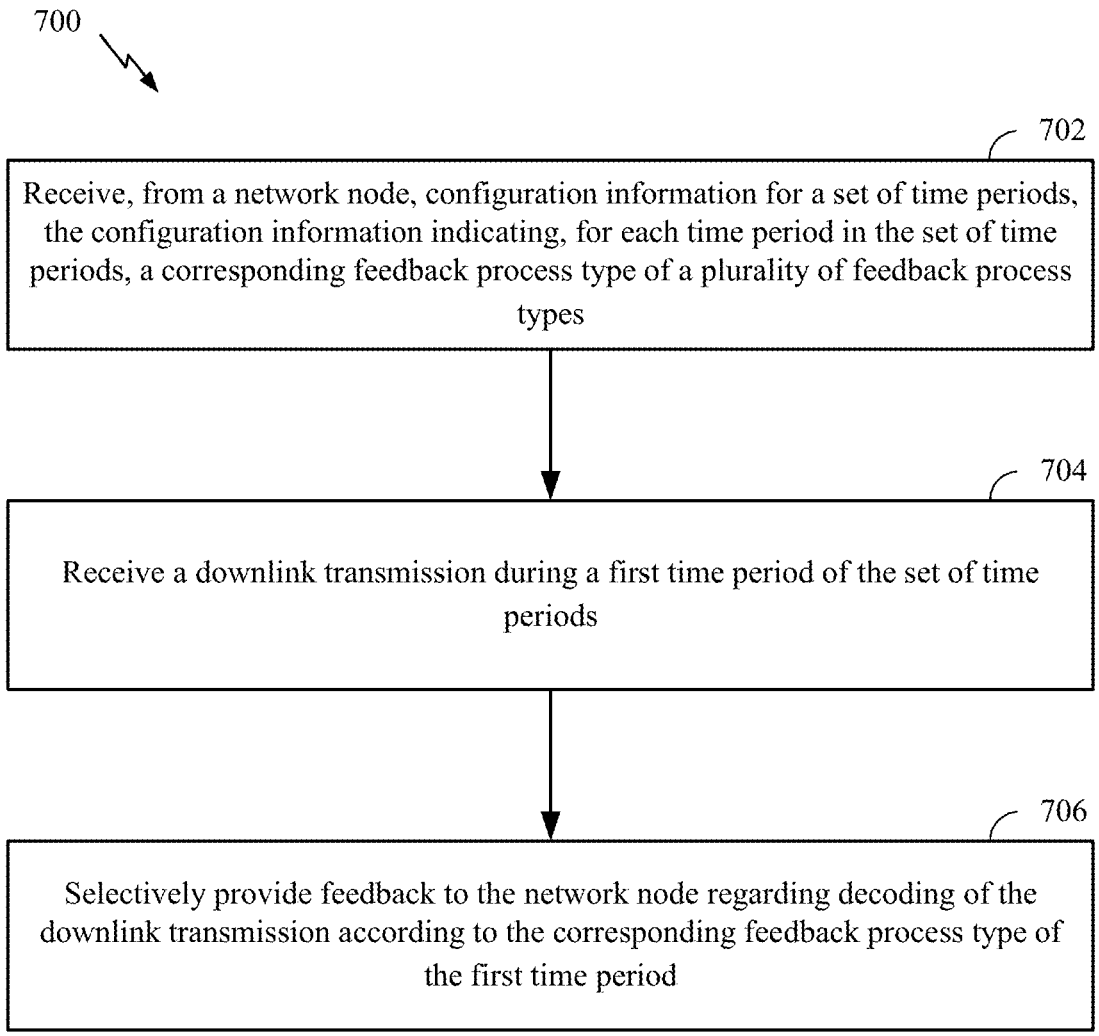
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., the UE 120a in the wireless communication network 100). The operations 700 may be implemented as software components that are executed and run on one or more processors (e.g., controller/processor 280 of FIG. 2). Further, the transmission and reception of signals by the UE in the operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 702, where the UE may receive, from a network node, configuration information for a set of time periods, the configuration information indicating, for each time period in the set of time periods, a corresponding feedback process type of a plurality of feedback process types. Further, at block 704, the UE may receive a downlink transmission during a first time period of the set of time periods. At block 706, the UE may selectively provide feedback (e.g., transmit feedback or withhold transmission of feedback) to the network node regarding decoding of the downlink transmission according to the corresponding feedback process type of the first time period.

In certain aspects of operations 700, the configuration information indicates: a pattern of the feedback process types as applied to the set of time periods, a periodicity of the pattern, and an identifier of a time period of the set of time periods at which the pattern starts.

In certain aspects of operations 700, the plurality of feedback process types include a feedback enabled type, a feedback disabled type, and a flexible feedback type. In certain such aspects, operations 700 further include receiving, from the network node, signaling indicating a feedback process type change of the first time period from the flexible feedback type to one of the feedback enabled type or the feedback disabled type, wherein selectively providing the feedback is according to the one of the feedback enabled type or the feedback disabled type. In certain such aspects, the configuration is received in one of a system information block (SIB) or a radio resource control (RRC) message.

In certain aspects of operations 700, each time period of the set of time periods is associated with a corresponding index, and the configuration information comprises the indices of the set of time periods associated with their corresponding feedback process type.

In certain aspects of operations 700, operations 700 further include receiving the configuration information via one of a radio resource control (RRC) message or a medium access control (MAC) control element (CE).

In certain aspects of operations 700, the configuration information is specific to the UE. In certain such aspects, the configuration information is dependent on at least one of traffic or quality of service requirement of the UE. In certain such aspects, operations 700 further include receiving, from the network node, a second configuration information for the set of time periods, the second configuration being applicable to all UEs in a cell of the network node, wherein a feedback process type indicated in the configuration information for the first time period overrides a conflicting feedback process indicated in the second configuration information for the first time period.

In certain aspects of operations 700, operations 700 further include receiving, from the network node, a mapping of pattern indices to patterns of feedback process types as applied to a number of time periods. In certain such aspects, the mapping is received in a radio resource control (RRC) message. In certain such aspects, the number of time periods depends on a round-trip time between the UE and the network node. In certain such aspects, the configuration information comprises a pattern index of the pattern indices, and the pattern of feedback process types corresponding to the pattern index is applied to the set of time periods. In certain such aspects, operations 700 further include receiving, from the network node, an action time indicating a time delay between receiving the configuration information and applying the configuration information. In certain such aspects, the configuration information is dependent on at least one of traffic or quality of service requirement of the UE.

In certain aspects of operations 700, the set of time periods comprise a set of slots.

In certain aspects of operations 700, the set of time periods comprise a set of downlink transmission occasions.

Figure 8:
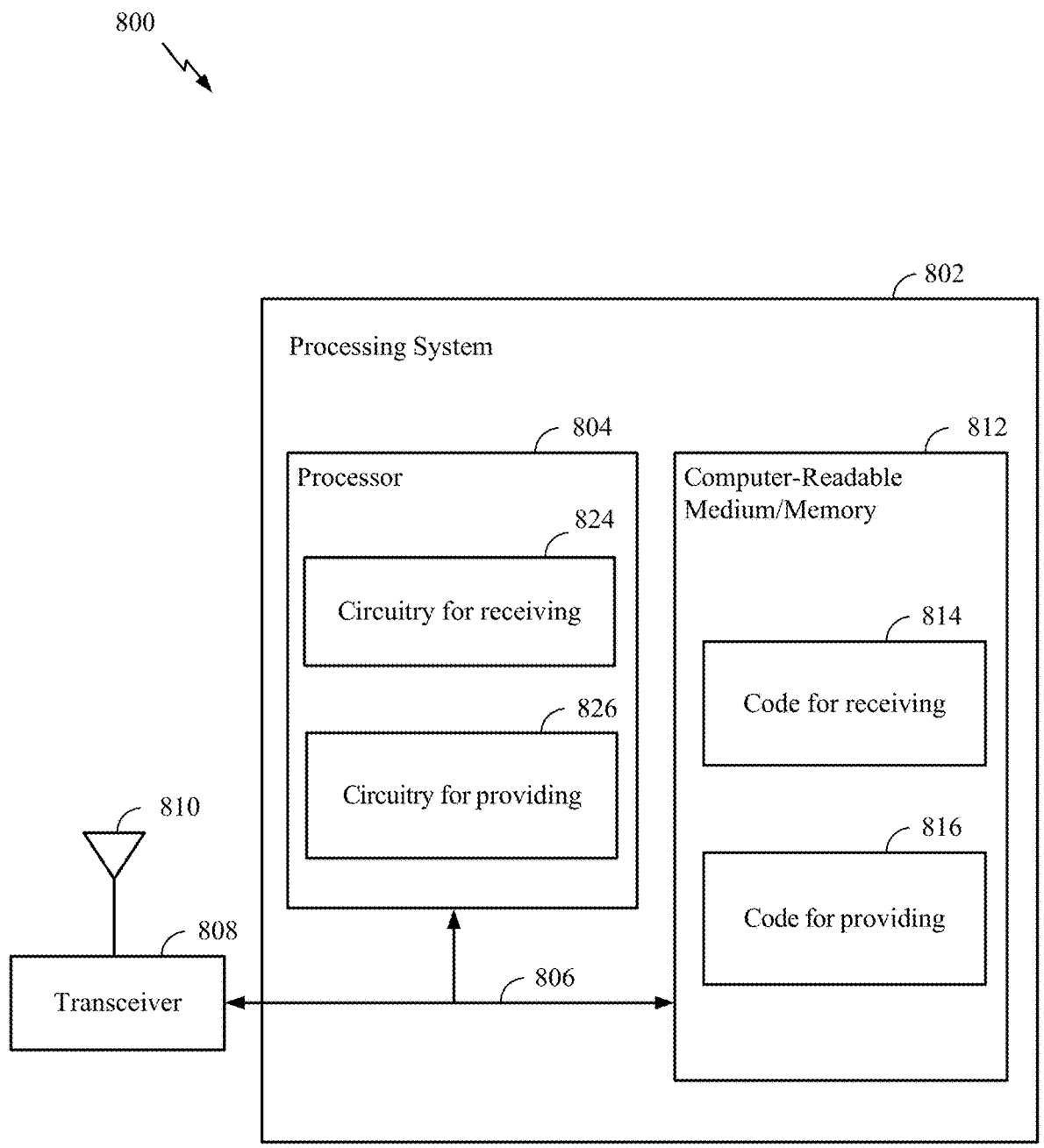
FIG. 8 illustrates a communications device (e.g., a UE) that may include various components configured to perform operations for the techniques disclosed herein in accordance with aspects of the present disclosure.

FIG. 8 illustrates a communications device 800 (e.g., the UE 120*a*) that may include various components (e.g., corresponding to means-plus-function components) configured to perform operations for the techniques disclosed herein, such as the operations illustrated in FIGS. 6 and 7. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIGS. 6 and 7, or other operations for performing the various techniques discussed herein for reporting one-shot HARQ feedback.

In certain aspects, computer-readable medium/memory 812 stores code 814 for receiving, from a network node, a configuration of a search space comprising time and frequency resources available to the network node for communicating a downlink control channel, the configuration indicating a feedback process type corresponding to the search space. Code 814 may also be for receiving, from the network node, the downlink control channel in the search space. Code 814 may also be for receiving a downlink transmission scheduled by the downlink control channel. Code 814 may also be for receiving, from a network node, configuration information for a set of time periods, the configuration information indicating, for each time period in the set of time periods, a corresponding feedback process type of a plurality of feedback process types. Code 814 may also be for receiving a downlink transmission during a first time period of the set of time periods. Code 814 may also be for receiving, from the network node, signaling indicating a feedback process type change of the first time period from the flexible feedback type to one of the feedback enabled type or the feedback disabled type, wherein selectively providing the feedback is according to the one of the feedback enabled type or the feedback disabled type. Code 814 may also be for receiving the configuration information via one of a radio resource control (RRC) message or a medium access control (MAC) control element (CE). Code 814 may also be for receiving, from the network node, a second configuration information for the set of time periods, the second configuration being applicable to all UEs in a cell of the network node, wherein a feedback process type indicated in the configuration information for the first time period overrides a conflicting feedback process indicated in the second configuration information for the first time period. Code 814 may also be for receiving, from the network node, a mapping of pattern indices to patterns of feedback process types as applied to a number of time periods.

In certain aspects, computer-readable medium/memory 812 stores code 816 for selectively providing feedback to the network node regarding decoding of the downlink transmission according to the feedback process type corresponding to the search space. Code 816 may also be for selectively providing feedback to the network node regarding decoding of the downlink transmission according to the corresponding feedback process type of the first time period.

In certain aspects, the processor 804 has circuitry configured to implement the code stored in the computer-readable medium/memory 812. The processor 804 includes circuitry 824 for receiving, from a network node, a configuration of a search space comprising time and frequency resources available to the network node for communicating a downlink control channel, the configuration indicating a feedback process type corresponding to the search space. Circuitry 824 may also be for receiving, from the network node, the downlink control channel in the search space. Circuitry 824 may also be for receiving a downlink transmission scheduled by the downlink control channel. Circuitry 824 may also be for receiving, from a network node, configuration information for a set of time periods, the configuration information indicating, for each time period in the set of time periods, a corresponding feedback process type of a plurality of feedback process types. Circuitry 824 may also be for receiving a downlink transmission during a first time period of the set of time periods. Circuitry 824 may also be for receiving, from the network node, signaling indicating a feedback process type change of the first time period from the flexible feedback type to one of the feedback enabled type or the feedback disabled type, wherein selectively providing the feedback is according to the one of the feedback enabled type or the feedback disabled type. Circuitry 824 may also be for receiving the configuration information via one of a radio resource control (RRC) message or a medium access control (MAC) control element (CE). Circuitry 824 may also be for receiving, from the network node, a second configuration information for the set of time periods, the second configuration being applicable to all UEs in a cell of the network node, wherein a feedback process type indicated in the configuration information for the first time period overrides a conflicting feedback process indicated in the second configuration information for the first time period. Circuitry 824 may also be for receiving, from the network node, a mapping of pattern indices to patterns of feedback process types as applied to a number of time periods.

In certain aspects, the processor 804 includes circuitry 826 for selectively providing feedback to the network node regarding decoding of the downlink transmission according to the feedback process type corresponding to the search space. Code 816 may also be for selectively providing feedback to the network node regarding decoding of the downlink transmission according to the corresponding feedback process type of the first time period.

Various components of communications device 800 may provide means for performing the methods described herein, including with respect to FIGS. 6 and 7.

In some examples, means for transmitting, providing, or sending (or means for outputting for transmission) may include the transceivers 254 and/or antenna(s) 252 of the user equipment 120a illustrated in FIG. 2 and/or transceiver 808 and antenna 810 of the communication device 800 in FIG. 8.

In some examples, means for receiving (or means for obtaining) may include the transceivers 254 and/or antenna(s) 252 of the user equipment 120a illustrated in FIG. 2 and/or transceiver 808 and antenna 810 of the communication device 800 in FIG. 8.

In some examples, means for determining, generating, performing, mapping, etc., may include various processing system components, such as: the one or more processors 820 in FIG. 8, or aspects of the user equipment 120a depicted in FIG. 2, including receive processor 258, transmit processor 264, TX MIMO processor 266, and/or controller/processor 280 (including HARQ manager 281).

Notably, FIG. 8 is an example, and many other examples and configurations of communication device 800 are possible.

Figure 9:
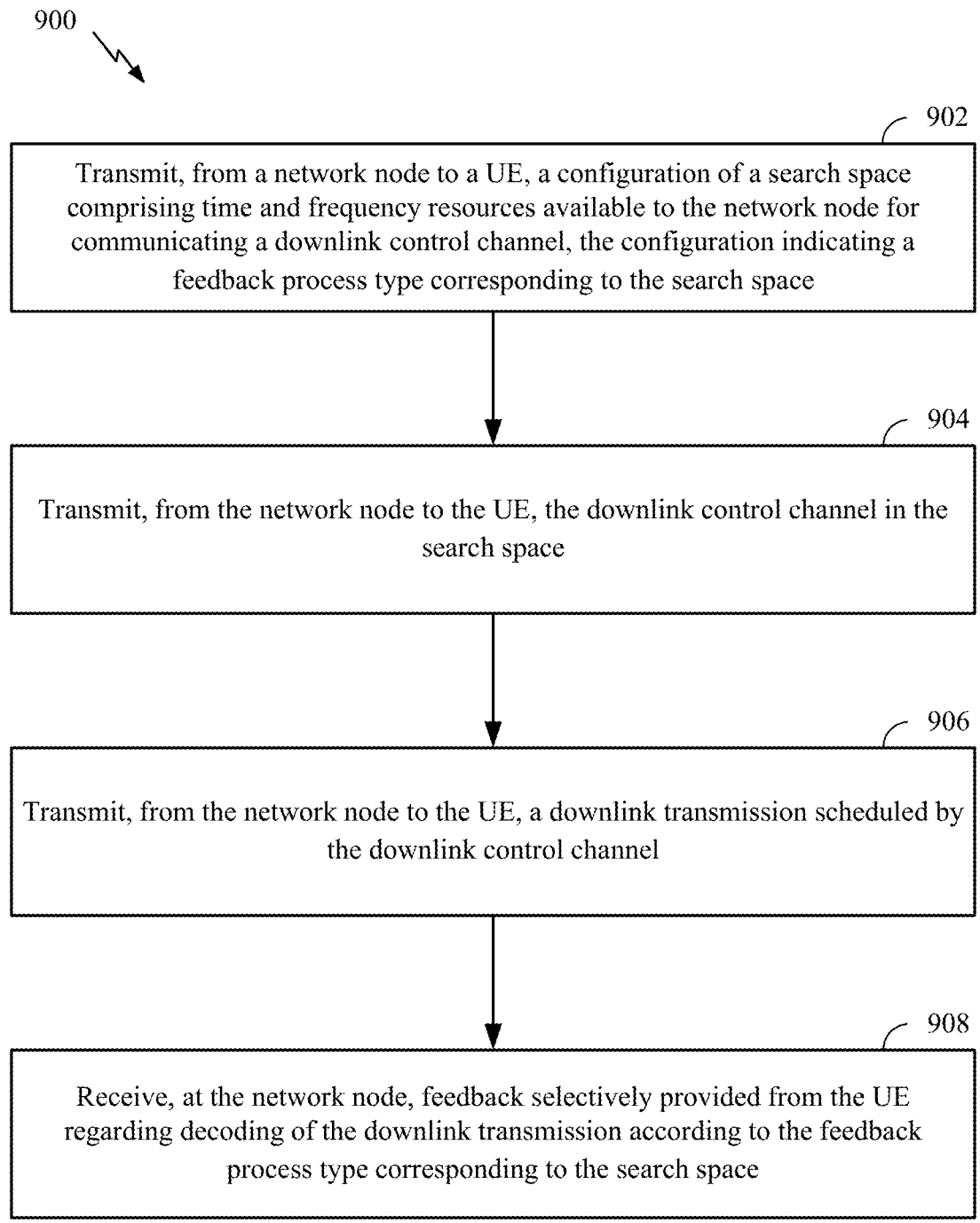
FIG. 9 is a flow diagram illustrating example operations for wireless communication by a base station, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., the BS 110a in the wireless communication network 100). The operations 900 may be implemented as software components that are executed and run on one or more processors (e.g., controller/processor 240 of FIG. 2). Further, the transmission and reception of signals by the BS in the operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at block 902, where the BS may transmit to a UE a configuration of a search space comprising time and frequency resources available to the network node for communicating a downlink control channel, the configuration indicating a feedback process type corresponding to the search space. At block 904, the BS may transmit to the UE the downlink control channel in the search space. At block 906, the BS may transmit to the UE a downlink transmission scheduled by the downlink control channel. At block 908, the BS may receive feedback selectively provided from the UE (e.g., the UE may transmit feedback or withhold transmission of feedback) regarding decoding of the downlink transmission according to the feedback process type corresponding to the search space.

Figure 10:
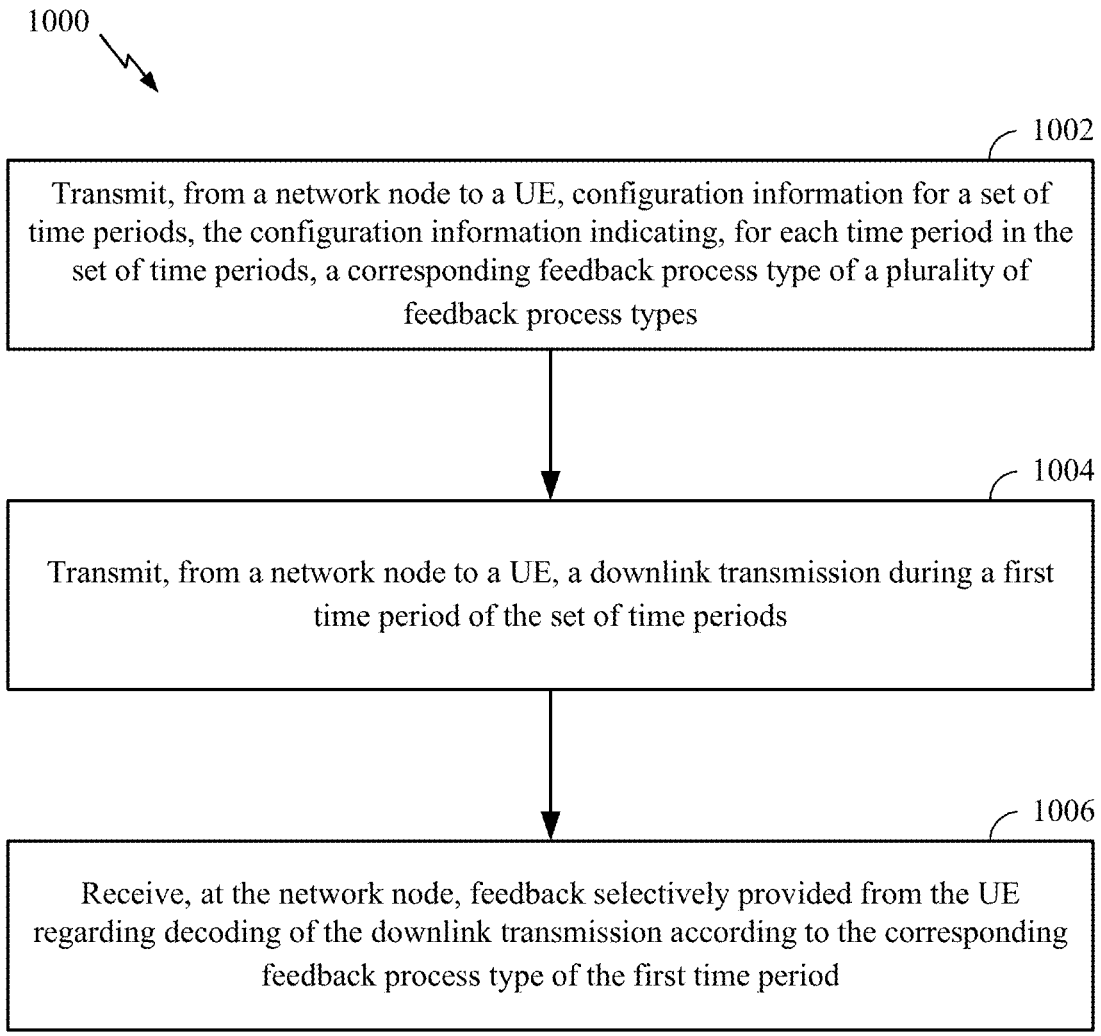
FIG. 10 is a flow diagram illustrating example operations for wireless communication by a base station, in accordance with certain aspects of the present disclosure.

FIG. 10 is a flow diagram illustrating example operations 1000 for wireless communication, in accordance with certain aspects of the present disclosure. The operations 1000 may be performed, for example, by a BS (e.g., the BS 110a in the wireless communication network 100). The operations 1000 may be implemented as software components that are executed and run on one or more processors (e.g., controller/processor 240 of FIG. 2). Further, the transmission and reception of signals by the BS in the operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at block 1002, where the BS may transmit to a UE configuration information for a set of time periods, the configuration information indicating, for each time period in the set of time periods, a corresponding feedback process type of a plurality of feedback process types. At block 1004, the BS may transmit to a UE a downlink transmission during a first time period of the set of time periods. At block 1006, the BS may receive feedback selectively provided from the UE (e.g., the UE may transmit feedback or withhold transmission of feedback) regarding decoding of the downlink transmission according to the corresponding feedback process type of the first time period.

Figure 11:
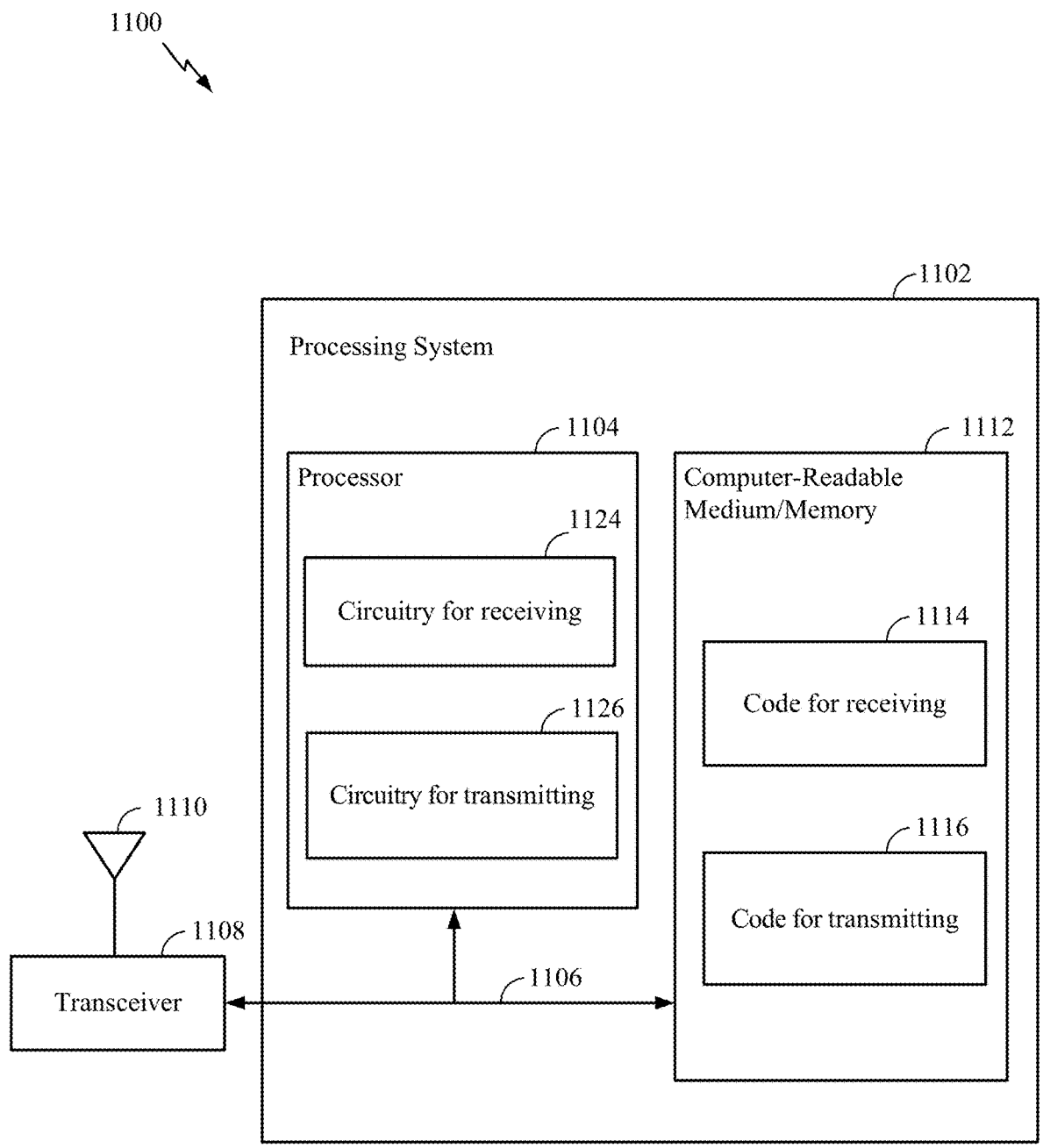
FIG. 11 illustrates a communications device (e.g., a base station) that may include various components configured to perform operations for the techniques disclosed herein in accordance with aspects of the present disclosure.

FIG. 11 illustrates a communications device 1100 (e.g., the BS 110a) that may include various components (e.g., corresponding to means-plus-function components) configured to perform operations for the techniques disclosed herein, such as the operations illustrated in FIGS. 9 and 10. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 9 and 10, or other operations for performing the various techniques discussed herein for reporting one-shot HARQ feedback.

In certain aspects, computer-readable medium/memory 1112 stores code 1114 for receiving, at the network node, feedback selectively provided from the UE regarding decoding of the downlink transmission according to the feedback process type corresponding to the search space. Code 1114 may also be for receiving, at the network node, feedback selectively provided from the UE regarding decoding of the downlink transmission according to the corresponding feedback process type of the first time period.

In certain aspects, computer-readable medium/memory 1112 stores code 1116 for transmitting, from a network node to a UE, a configuration of a search space comprising time and frequency resources available to the network node for communicating a downlink control channel, the configuration indicating a feedback process type corresponding to the search space. Code 1116 may also be for selectively providing feedback to the network node regarding decoding of the downlink transmission according to the corresponding feedback process type of the first time period. Code 1116 may also be for transmitting, from the network node to the UE, the downlink control channel in the search space. Code 1116 may also be for transmitting, from the network node to the UE, a downlink transmission scheduled by the downlink control channel. Code 1116 may also be for transmitting, from a network node to a UE, configuration information for a set of time periods, the configuration information indicating, for each time period in the set of time periods, a corresponding feedback process type of a plurality of feedback process types. Code 1116 may also be for transmitting, from a network node to a UE, a downlink transmission during a first time period of the set of time periods.

In certain aspects, the processor 1104 includes circuitry 1124 for receiving, at the network node, feedback selectively provided from the UE regarding decoding of the downlink transmission according to the feedback process type corresponding to the search space. Circuitry 1124 may also be for receiving, at the network node, feedback selectively provided from the UE regarding decoding of the downlink transmission according to the corresponding feedback process type of the first time period.

In certain aspects, the processor 1104 includes circuitry 1126 for transmitting, from a network node to a UE, a configuration of a search space comprising time and frequency resources available to the network node for communicating a downlink control channel, the configuration indicating a feedback process type corresponding to the search space. Circuitry 1126 may also be for selectively providing feedback to the network node regarding decoding of the downlink transmission according to the corresponding feedback process type of the first time period. Circuitry 1126 may also be for transmitting, from the network node to the UE, the downlink control channel in the search space. Circuitry 1126 may also be for transmitting, from the network node to the UE, a downlink transmission scheduled by the downlink control channel. Circuitry 1126 may also be for transmitting, from a network node to a UE, configuration information for a set of time periods, the configuration information indicating, for each time period in the set of time periods, a corresponding feedback process type of a plurality of feedback process types. Circuitry 1126 may also be for transmitting, from a network node to a UE, a downlink transmission during a first time period of the set of time periods.

Various components of communications device 1100 may provide means for performing the methods described herein, including with respect to FIGS. 9 and 10.

In some examples, means for transmitting or sending (or means for outputting for transmission) may include the transceivers 232 and/or antenna(s) 234 of the base station 110a illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the base station illustrated in FIG. 2 and/or transceiver 1108 and antenna 1110 of the communication device 1100 in FIG. 11.

In some examples, means for determining, generating, performing, mapping, etc., may include various processing system components, such as: the one or more processors 1120 in FIG. 11, or aspects of the base station 110a depicted in FIG. 2, including receive processor 238, transmit processor 220, TX MIMO processor 230, and/or controller/processor 240 (including HARQ manager 241).

Notably, FIG. 11 is an example, and many other examples and configurations of communication device 1100 are possible.

Figure 12:
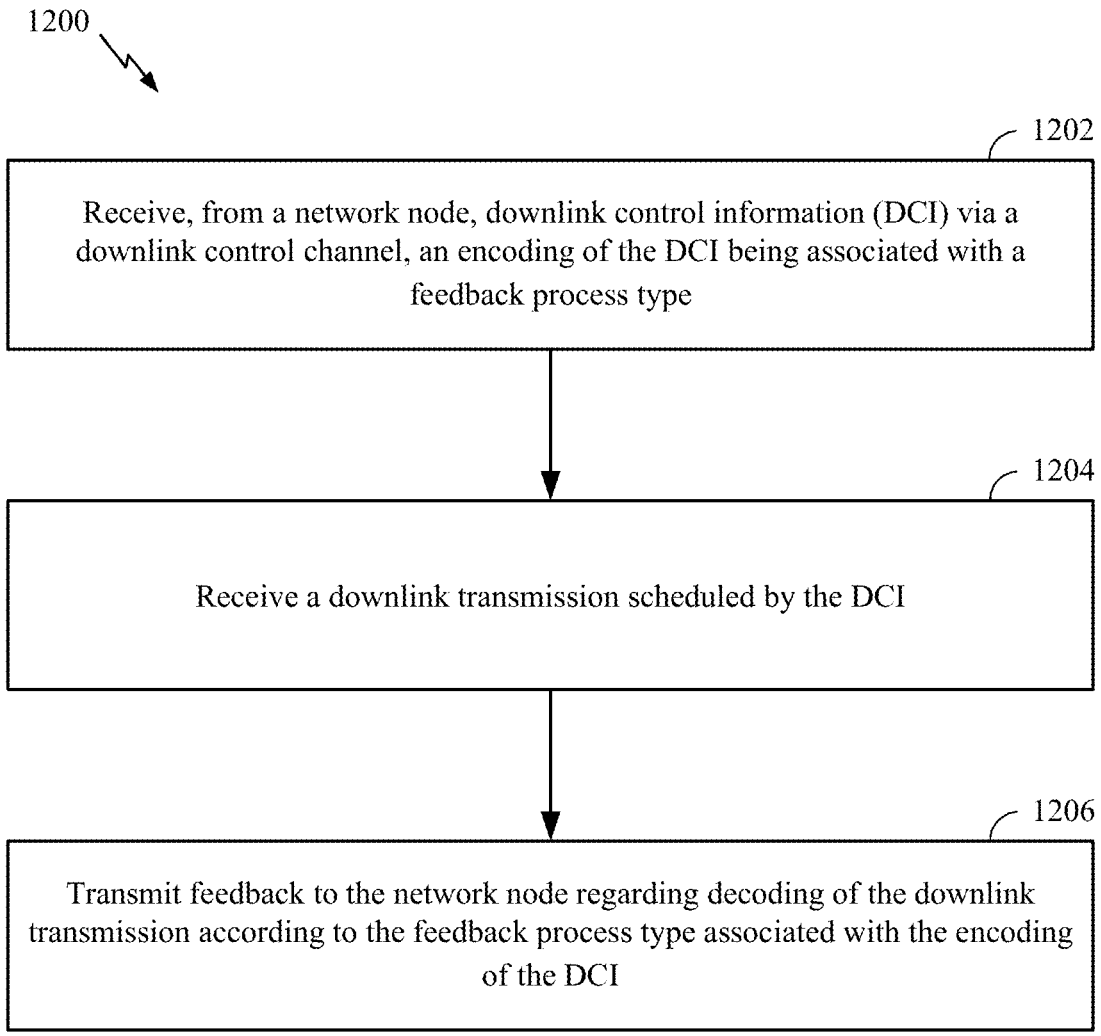
FIG. 12 is a flow diagram illustrating example operations for wireless communication by a user equipment, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (e.g., the UE 120a in the wireless communication network 100). The operations 1200 may be implemented as software components that are executed and run on one or more processors (e.g., controller/processor 280 of FIG. 2). Further, the transmission and reception of signals by the UE in the operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may begin, at a first block 1202, where the UE may receive, from a network node, downlink control information (DCI) via a downlink control channel, and encoding of the DCI being associated with a feedback process type.

At a second block 1204, the operations 1200 may proceed by receiving a downlink transmission scheduled by the DCI.

At block 1206, the operations 1200 may proceed by transmitting feedback to the network node regarding decoding of the downlink transmission according to the feedback process type associated with the encoding of the DCI.

In certain aspects, the operations 1200 may include receiving, from the network node, a mapping between an encoding of the DCI and the feedback process type, and determining, via the mapping, the feedback process type based on the encoding of the DCI.

In certain aspects, the encoding of the DCI comprises one or more of a size of the DCI or a format of the DCI.

In certain aspects, the operations 1200 may include processing downlink assigning index (DAI) according to the feedback process type.

Figure 13:
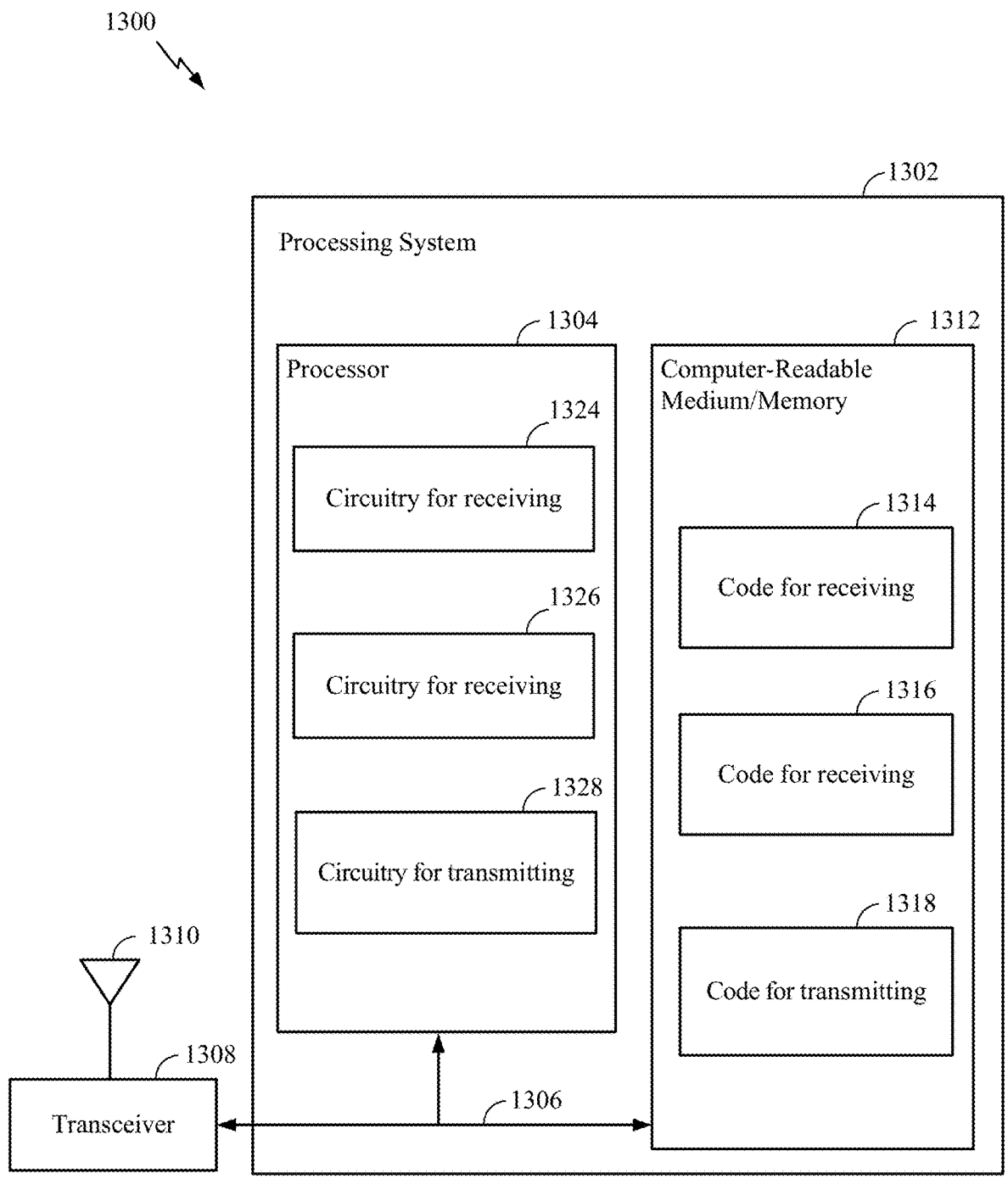
FIG. 13 illustrates a communications device (e.g., a user equipment) that may include various components configured to perform operations for the techniques disclosed herein in accordance with aspects of the present disclosure.

FIG. 13 illustrates a communications device 1300 (e.g., the UE 120*a* of FIGS. 1 and 2) that may include various components (e.g., corresponding to means-plus-function components) configured to perform operations for the techniques disclosed herein, such as the operations illustrated in FIG. 12. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 12, or other operations for performing the various techniques discussed herein for reporting one-shot HARQ feedback.

In certain aspects, computer-readable medium/memory 1312 stores code 1314 for receiving, from a network node, downlink control information (DCI) via a downlink control channel, an encoding of the DCI being associated with a feedback process type.

In certain aspects, computer-readable medium/memory 1312 stores code 1316 for receiving a downlink transmission scheduled by the DCI.

In certain aspects, computer-readable medium/memory 1312 stores code 1318 for transmitting feedback to the network node regarding decoding of the downlink transmission according to the feedback process type associated with the encoding of the DCI.

In certain aspects, the processor 1304 includes circuitry 1324 for receiving, from a network node, downlink control information (DCI) via a downlink control channel, and encoding of the DCI being associated with a feedback process type.

In certain aspects, the processor 1304 includes circuitry 1326 for receiving a downlink transmission scheduled by the DCI.

In certain aspects, the processor 1304 includes circuitry 1328 for transmitting feedback to the network node regarding decoding of the downlink transmission according to the feedback process type associated with the encoding of the DCI.

Various components of communications device 1300 may provide means for performing the methods described herein, including with respect to FIG. 12.

In some examples, means for transmitting or sending (or means for outputting for transmission) may include the transceivers 254 and/or antenna(s) 252 of the user equipment 120*a* illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the user equipment 120*a* illustrated in FIG. 2 and/or transceiver 1308 and antenna 1310 of the communication device 1300 in FIG. 13.

In some examples, means for determining, generating, performing, mapping, etc., may include various processing system components, such as: the one or more processors 1302 in FIG. 13, or aspects of the user equipment 120*a* depicted in FIG. 2, including receive processor 258, transmit processor 264, TX MIMO processor 266, and/or controller/processor 280 (including HARQ manager 281).

Notably, FIG. 13 is an example, and many other examples and configurations of communication device 1300 are possible.

Figure 14:
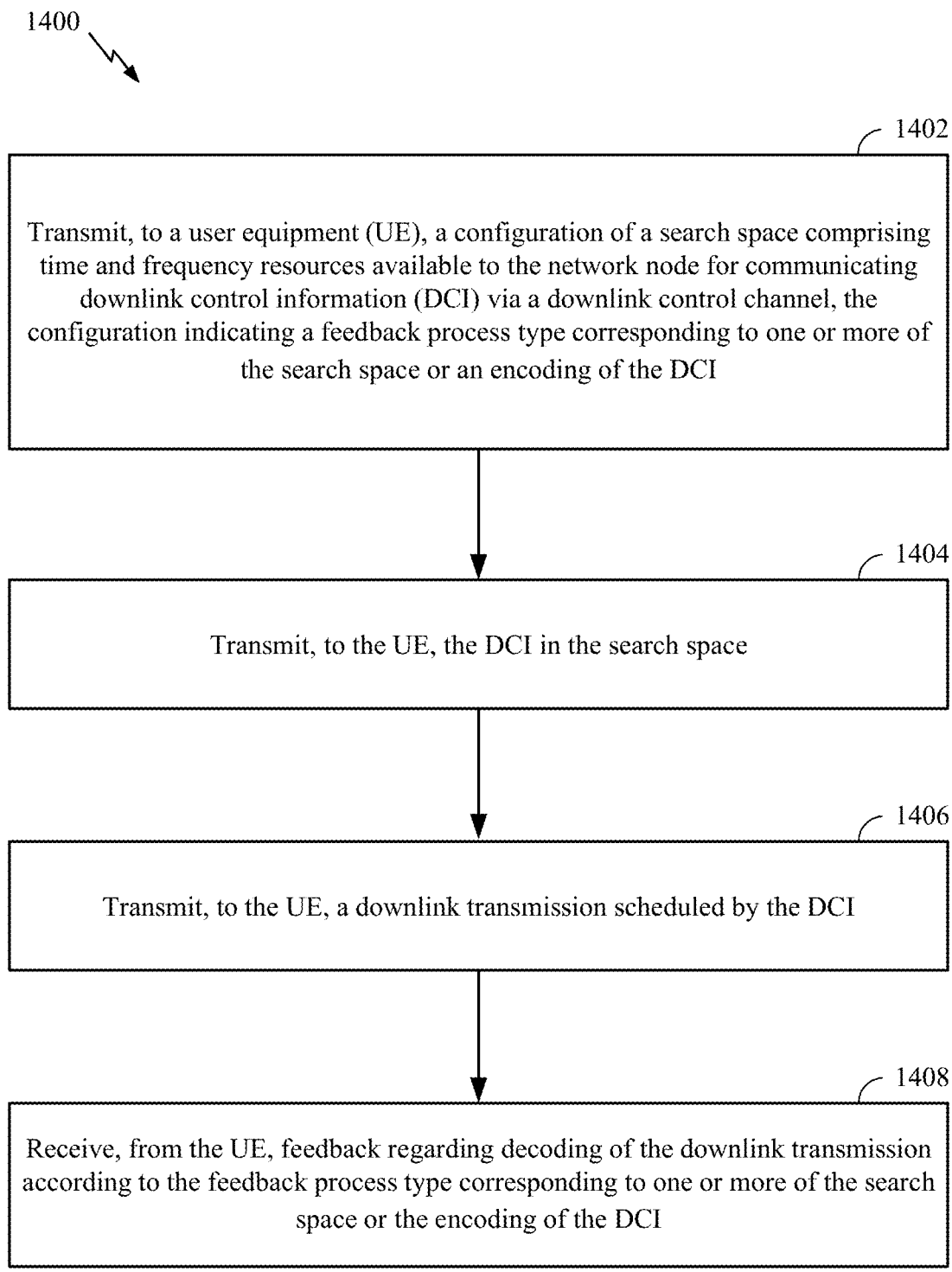
FIG. 14 is a flow diagram illustrating example operations for wireless communication by a base station, in accordance with certain aspects of the present disclosure.

FIG. 14 is a flow diagram illustrating example operations 1400 for wireless communication, in accordance with certain aspects of the present disclosure. The operations 1400 may be performed, for example, by a BS (e.g., the BS 110*a* in the wireless communication network 100). The operations 1400 may be implemented as software components that are executed and run on one or more processors (e.g., controller/processor 240 of FIG. 2). Further, the transmission and reception of signals by the BS in the operations 1400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1400 may begin, at first block 1402, by transmitting, to a user equipment (UE), a configuration of a search space comprising time and frequency resources available to the network node for communicating downlink control information (DCI) via a downlink control channel, the configuration indicating a feedback process type corresponding to one or more of the search space or an encoding of the DCI.

At a second block 1404, the operations 1400 may proceed to transmit, to the UE, the DCI in the search space.

At a third block 1406, the operations 1400 may proceed to transmit, to the UE, a downlink transmission scheduled by the DCI.

At a fourth block 1408, the operations 1400 may proceed to receive, from the UE, feedback regarding decoding of the downlink transmission according to the feedback process type corresponding to one or more of the search space or the encoding of the DCI.

In certain aspects, the configuration indicating the feedback process type for the encoding of the DCI comprises a mapping between the encoding of the DCI and the feedback process type, and wherein the encoding of the DCI comprises one or more of a size of the DCI or a format of the DCI.

In certain aspects, the configuration indicating the feedback process type for the search space comprises the configuration including a field, wherein different values of the field indicate a feedback enabled type, a feedback disabled type, and a flexible feedback type.

Figure 15:
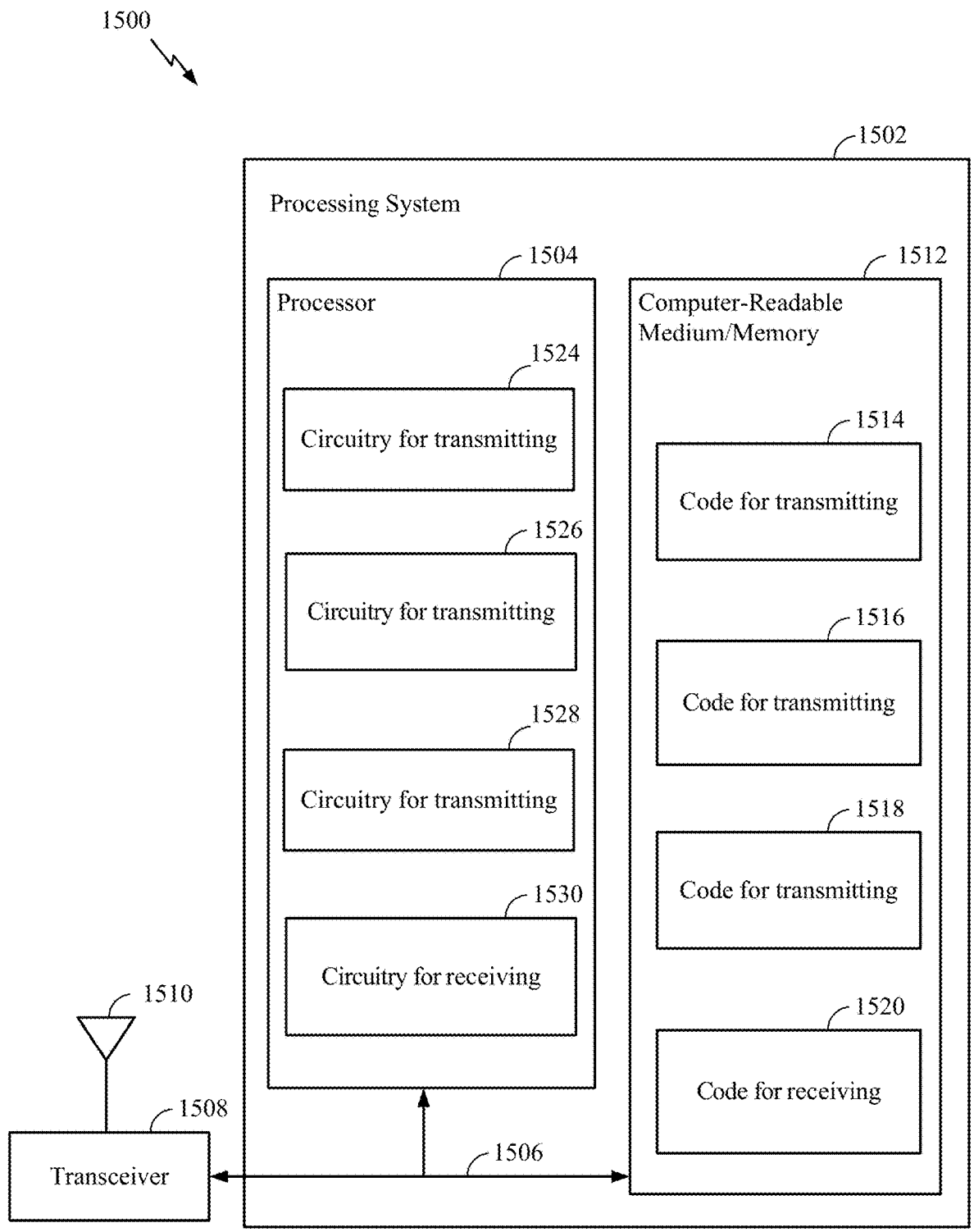
FIG. 15 illustrates a communications device (e.g., a base station) that may include various components configured to perform operations for the techniques disclosed herein in accordance with aspects of the present disclosure.

FIG. 15 illustrates a communications device 1500 (e.g., the BS 110*a*) that may include various components (e.g., corresponding to means-plus-function components) configured to perform operations for the techniques disclosed herein, such as the operations illustrated in FIG. 14. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 14, or other operations for performing the various techniques discussed herein for reporting one-shot HARQ feedback.

In certain aspects, computer-readable medium/memory 1512 stores code 1514 for transmitting, to a user equipment (UE), a configuration of a search space comprising time and frequency resources available to the network node for communicating downlink control information (DCI) via a downlink control channel, the configuration indicating a feedback process type corresponding to one or more of the search space or an encoding of the DCI.

In certain aspects, computer-readable medium/memory 1512 stores code 1516 for transmitting, to the UE, the DCI in the search space.

In certain aspects, computer-readable medium/memory 1512 stores code 1518 for transmitting, to the UE, a downlink transmission scheduled by the DCI.

In certain aspects, computer-readable medium/memory 1512 stores code 1520 for receiving, from the UE, feedback regarding decoding of the downlink transmission according to the feedback process type corresponding to one or more of the search space or the encoding of the DCI.

In certain aspects, the processor 1504 includes circuitry 1524 for transmitting, to a user equipment (UE), a configuration of a search space comprising time and frequency resources available to the network node for communicating downlink control information (DCI) via a downlink control channel, the configuration indicating a feedback process type corresponding to one or more of the search space or an encoding of the DCI.

In certain aspects, the processor 1504 includes circuitry 1526 for transmitting, to the UE, the DCI in the search space.

In certain aspects, the processor 1504 includes circuitry 1528 for transmitting, to the UE, a downlink transmission scheduled by the DCI.

In certain aspects, the processor 1504 includes circuitry 1530 for receiving, from the UE, feedback regarding decoding of the downlink transmission according to the feedback process type corresponding to one or more of the search space or the encoding of the DCI.

Various components of communications device 1500 may provide means for performing the methods described herein, including with respect to FIG. 14.

In some examples, means for transmitting or sending (or means for outputting for transmission) may include the transceivers 232 and/or antenna(s) 234 of the base station 110a illustrated in FIG. 2 and/or transceiver 1508 and antenna 1510 of the communication device 1500 in FIG. 15.

In some examples, means for receiving (or means for obtaining) may include the transceivers 232 and/or antenna(s) 234 of the base station illustrated in FIG. 2 and/or transceiver 1508 and antenna 1510 of the communication device 1500 in FIG. 15.

In some examples, means for determining, generating, performing, mapping, etc., may include various processing system components, such as: the one or more processors 1502 in FIG. 15, or aspects of the base station 110a depicted in FIG. 2, including receive processor 238, transmit processor 220, TX MIMO processor 230, and/or controller/processor 240 (including HARQ manager 241).

Notably, FIG. 15 is an example, and many other examples and configurations of communication device 1500 are possible.

EXAMPLE ASPECTS

Implementation examples are described in the following numbered aspects:

1: A method for wireless communication by a UE, includes receiving, from a network node, a configuration of a search space comprising time and frequency resources available to the network node for communicating a downlink control channel, the configuration indicating a feedback process type corresponding to the search space; receiving, from the network node, the downlink control channel in the search space; receiving a downlink transmission scheduled by the downlink control channel; and selectively providing feedback to the network node regarding decoding of the downlink transmission according to the feedback process type corresponding to the search space.

2: The method of aspect 1, wherein the configuration of the search space is received in a radio resource control (RRC) message.

3: The method of one or more of aspects 1 or 2, wherein the configuration indicating a feedback process type for the search space comprises the configuration including a field, wherein different values of the field indicate a feedback enabled type, a feedback disabled type, and a flexible feedback type.

4: The method of one or more of aspects 1 through 3, wherein a number of time and frequency resources available to the network node for communicating the downlink control channel is based on the feedback process type.

5: The method of one or more of aspects 1 through 4, wherein a format of the downlink control channel is based on the feedback process type.

6: The method of one or more of aspects 1 through 5, wherein a control channel element (CCE) aggregation level of the downlink control channel is based on the feedback process type.

7: The method of one or more of aspects 1 through 6, wherein an encoding of a downlink control information (DCI) included in the downlink control channel is based on the feedback process type.

8: The method of one or more of aspects 1 through 7, wherein the encoding of the DCI comprises one or more of a size of the DCI and a format of the DCI.

9: A method for a user equipment (UE) to communicate feedback, comprising: receiving, from a network node, configuration information for a set of time periods, the configuration information indicating, for each time period in the set of time periods, a corresponding feedback process type of a plurality of feedback process types; receiving a downlink transmission during a first time period of the set of time periods; and selectively providing feedback to the network node regarding decoding of the downlink transmission according to the corresponding feedback process type of the first time period.

10: The method of aspect 9, wherein the configuration information indicates: a pattern of the feedback process types as applied to the set of time periods, a periodicity of the pattern, and an identifier of a time period of the set of time periods at which the pattern starts.

11: The method of one or more of aspects 9 or 10, wherein the plurality of feedback process types include a feedback enabled type, a feedback disabled type, and a flexible feedback type.

12: The method of one or more of aspects 9 through 11, further comprising receiving, from the network node, signaling indicating a feedback process type change of the first time period from the flexible feedback type to one of the feedback enabled type or the feedback disabled type, wherein selectively providing the feedback is according to the one of the feedback enabled type or the feedback disabled type.

13: The method of one or more of aspects 9 through 12, wherein the configuration is applicable to all UEs in a cell of the network node.

14: The method of one or more of aspects 9 through 13, wherein the configuration is received in one of a system information block (SIB) or a radio resource control (RRC) message.

15: The method of one or more of aspects 9 through 14, wherein each time period of the set of time periods is associated with a corresponding index, wherein the configuration information comprises the indices of the set of time periods associated with their corresponding feedback process type.

16: The method of one or more of aspects 9 through 15, further comprising receiving the configuration information via one of a radio resource control (RRC) message or a medium access control (MAC) control element (CE).

17: The method of one or more of aspects 9 through 16, wherein the configuration information is specific to the UE.

18: The method of one or more of aspects 9 through 17, wherein the configuration information is dependent on at least one of traffic or quality of service requirement of the UE.

19: The method of one or more of aspects 9 through 18, further comprising: receiving, from the network node, a second configuration information for the set of time periods, the second configuration being applicable to all UEs in a cell of the network node, wherein a feedback process type indicated in the configuration information for the first time period overrides a conflicting feedback process indicated in the second configuration information for the first time period.

20: The method of one or more of aspects 9 through 19, further comprising: receiving, from the network node, a mapping of pattern indices to patterns of feedback process types as applied to a number of time periods.

21: The method of one or more of aspects 9 through 20, wherein the mapping is received in a radio resource control (RRC) message.

22: The method of one or more of aspects 9 through 21, wherein the number of time periods depends on a round-trip time between the UE and the network node.

23: The method of one or more of aspects 9 through 22, wherein the configuration information comprises a pattern index of the pattern indices, wherein the pattern of feedback process types corresponding to the pattern index is applied to the set of time periods.

24: The method of one or more of aspects 9 through 23, further comprising receiving, from the network node, an action time indicating a time delay between receiving the configuration information and applying the configuration information.

25: The method of one or more of aspects 9 through 24, wherein the configuration information is dependent on at least one of traffic or quality of service requirement of the UE.

26: The method of one or more of aspects 9 through 25, wherein the set of time periods comprise a set of slots.

27: The method of one or more of aspects 9 through 26, wherein the set of time periods comprise a set of downlink transmission occasions.

28: A user equipment (UE) for wireless communications, comprising means for performing one or more of the methods of the first through twenty-seventh aspects.

29: A user equipment (UE) for wireless communications, comprising a memory and a processor coupled to the memory, the memory and the processor configured to perform one or more of the methods of the first through twenty-seventh aspects.

30: A computer-readable medium, the computer-readable medium including instructions that, when executed by at least one processor of a user equipment (UE), cause the at least one processor to perform one or more of the methods of the first through twenty-seventh aspects.

31: A method for a base station to perform a method complimentary to one or more of the methods of the first through twenty-seventh aspects.

32: A base station comprising means for performing a method complimentary to one or more of the methods of the first through twenty-seventh aspects.

33: A base station for wireless communications, comprising a memory and a processor coupled to the memory, the memory and the processor configured to perform a method complimentary to one or more of the methods of the first through twenty-seventh aspects.

34: A computer-readable medium, the computer-readable medium including instructions that, when executed by at least one processor of a base station, cause the at least one processor to perform a method complimentary to one or more of the methods of the first through twenty-seventh aspects.

35: A user equipment (UE) configured to communicate feedback, comprising: a memory; and a processor coupled to the memory, the processor and the memory configured to: receive, from a network node, downlink control information (DCI) via a downlink control channel, an encoding of the DCI being associated with a feedback process type; receive a downlink transmission scheduled by the DCI; and transmit feedback to the network node regarding decoding of the downlink transmission according to the feedback process type associated with the encoding of the DCI.

36: The UE of aspect 35, wherein the processor and the memory are further configured to: receive, from the network node, a mapping between an encoding of the DCI and the feedback process type; and determine, via the mapping, the feedback process type based on the encoding of the DCI.

37: The UE of aspect 36, wherein the encoding of the DCI comprises one or more of a size of the DCI or a format of the DCI.

38: A method for communicate feedback by a user equipment (UE), comprising: receiving, from a network node, downlink control information (DCI) via a downlink control channel, an encoding of the DCI being associated with a feedback process type; receiving a downlink transmission scheduled by the DCI; and transmitting feedback to the network node regarding decoding of the downlink transmission according to the feedback process type associated with the DCI.

39: The method of aspect 38, further comprising: receiving, from the network node, a mapping between an encoding of the DCI and the feedback process type; and determining, via the mapping, the feedback process type based on the encoding of the DCI.

40: The method of aspect 39, wherein the encoding of the DCI comprises one or more of a size of the DCI or a format of the DCI.

41: The method of aspect 38, further comprising processing downlink assigning index (DAI) according to the feedback process type.

42: A user equipment (UE) for wireless communications, comprising means for performing one or more of the methods of aspects 38 through 41.

43: A computer-readable medium, the computer-readable medium including instructions that, when executed by at least one processor of a user equipment (UE), cause the at least one processor to perform one or more of the methods of aspects 38 through 41.

44: A method for a base station to perform a method complimentary to one or more of the methods of aspects 38 through 41.

45: A base station comprising means for performing a method complimentary to one or more of the methods of aspects 38 through 41.

46: A base station for wireless communications, comprising a memory and a processor coupled to the memory, the memory and the processor configured to perform a method complimentary to one or more of the methods of aspects 38 through 41.

47: A computer-readable medium, the computer-readable medium including instructions that, when executed by at least one processor of a base station, cause the at least one processor to perform a method complimentary to one or more of the methods of aspects 38 through 41.

48: A base station (BS) configured for wireless communication, comprising: a memory; and a processor coupled to the memory, the processor and the memory configured to: transmit, to a user equipment (UE), a configuration of a search space comprising time and frequency resources available to the network node for communicating downlink control information (DCI) via a downlink control channel, the configuration indicating a feedback process type corresponding to one or more of the search space or an encoding of the DCI; transmit, to the UE, the DCI in the search space; transmit, to the UE, a downlink transmission scheduled by the DCI; and receive, from the UE, feedback regarding decoding of the downlink transmission according to the feedback process type corresponding to one or more of the search space or the encoding of the DCI.

49: The BS of aspect 48, wherein the configuration indicating the feedback process type for the encoding of the DCI comprises a mapping between the encoding of the DCI and the feedback process type, and wherein the encoding of the DCI comprises one or more of a size of the DCI or a format of the DCI.

50: The BS of one or more of aspects 48 or 49, wherein the configuration indicating the feedback process type for the search space comprises the configuration including a field, wherein different values of the field indicate a feedback enabled type, a feedback disabled type, and a flexible feedback type.

51: A method for wireless communication by a base station (BS), comprising: transmitting, to a user equipment (UE), a configuration of a search space comprising time and frequency resources available to the network node for communicating downlink control information (DCI) via a downlink control channel, the configuration indicating a feedback process type corresponding to one or more of the search space or an encoding of the DCI; transmitting, to the UE, the DCI in the search space; transmitting, to the UE, a downlink transmission scheduled by the DCI; and receiving, from the UE, feedback regarding decoding of the downlink transmission according to the feedback process type corresponding to one or more of the search space or the encoding of the DCI.

52: The BS of aspect 51, wherein the configuration indicating the feedback process type for the encoding of the DCI comprises a mapping between the encoding of the DCI and the feedback process type, and wherein the encoding of the DCI comprises one or more of a size of the DCI or a format of the DCI.

53: The BS of one or more of aspects 51 or 52, wherein the configuration indicating the feedback process type for the search space comprises the configuration including a field, wherein different values of the field indicate a feedback enabled type, a feedback disabled type, and a flexible feedback type.

54: A base station (BS) for wireless communications, comprising means for performing one or more of the methods of aspects 51-53.

55: A base station (BS) for wireless communications, comprising a memory and a processor coupled to the memory, the memory and the processor configured to perform one or more of the methods of aspects 51-53.

56: A computer-readable medium, the computer-readable medium including instructions that, when executed by at least one processor of a base station (BS), cause the at least one processor to perform one or more of the methods of aspects 51-53.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6, FIG. 7, FIG. 9, and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the methods and apparatus described above without departing from the scope of the claims.

The invention claimed is:

1. An apparatus for wireless communication, comprising:
at least one memory comprising computer-executable instructions; and
one or more processors configured to execute the computer-executable instructions and cause the apparatus to:
obtain a configuration of a search space comprising available time and frequency resources, wherein:
the configuration indicates a feedback process type corresponding to the search space; and
the feedback process type comprises one of a feedback enabled type, a feedback disabled type, and a flexible feedback type;
obtain a downlink control channel in the search space;
obtain a downlink transmission scheduled by the downlink control channel; and
selectively output feedback regarding decoding of the downlink transmission according to the feedback process type corresponding to the search space.

2. The apparatus of claim 1, wherein the one or more processors are further configured to cause the apparatus to obtain the configuration of the search space via a radio resource control (RRC) message.

3. The apparatus of claim 1, wherein:
the configuration includes at least one field; and
different values of the field indicate different feedback process types including the feedback enabled type, the feedback disabled type, and the flexible feedback type.

4. The apparatus of claim 1, wherein a quantity of time and frequency resources available to the network node for communicating the downlink control channel is based on the feedback process type.

5. The apparatus of claim 1, wherein a format of the downlink control channel is based on the feedback process type.

6. The apparatus of claim 1, wherein a control channel element (CCE) aggregation level of the downlink control channel is based on the feedback process type.

7. The apparatus of claim 1, wherein:
an encoding of a downlink control information (DCI), included in the downlink control channel, is based on the feedback process type corresponding to the search space.

8. The apparatus of claim 7, wherein the encoding of the DCI comprises one or more of a size of the DCI or a format of the DCI.

9. The apparatus of claim 1, further comprising at least one transceiver configured to:
receive the configuration of the search space;
receive the downlink control channel;
receive the downlink transmission; and
transmit the feedback, wherein the apparatus is configured as a user equipment.

10. An apparatus for wireless communication, comprising:
at least one memory comprising computer-executable instructions; and
one or more processors configured to execute the computer-executable instructions and cause the apparatus to:
obtain downlink control information (DCI) via a downlink control channel, wherein:
an encoding of the DCI is associated with a feedback process type; and
the feedback process type comprises one of a feedback enabled type, a feedback disabled type, and a flexible feedback type; and
obtain a downlink transmission scheduled by the DCI; and
output feedback regarding decoding of the downlink transmission according to the feedback process type associated with the encoding of the DCI.

11. The apparatus of claim 10, wherein the one or more processors are further configured to cause the apparatus to:
obtain a mapping between the encoding of the DCI and the feedback process type; and
output the feedback regarding the decoding of the downlink transmission based on the mapping.

12. The apparatus of claim 10, wherein the one or more processors are further configured to cause the apparatus to process downlink assigning index (DAI) according to the feedback process type.

13. The apparatus of claim 10, further comprising at least one transceiver configured to:
receive the DCI;
receive the downlink transmission; and
transmit the feedback, wherein the apparatus is configured as a user equipment.

14. An apparatus for wireless communication, comprising:
at least one memory comprising computer-executable instructions; and
one or more processors configured to execute the computer-executable instructions and cause the apparatus to:
obtain configuration information for a set of time periods, the configuration information indicating, for each time period in the set of time periods, a corresponding feedback process type, wherein the corresponding feedback process type comprises one of a feedback enabled type, a feedback disabled type, and a flexible feedback type;
obtain a downlink transmission during a first time period of the set of time periods; and
selectively output feedback regarding decoding of the downlink transmission according to the corresponding feedback process type of the first time period.

15. The apparatus of claim 14, wherein the configuration information indicates at least one of:
a pattern of the feedback process types as applied to the set of time periods,
a periodicity of the pattern, or
an identifier of a time period of the set of time periods at which the pattern starts.

16. The apparatus of claim 14, wherein:
the one or more processors are further configured to cause the apparatus to obtain signaling indicating a change of the feedback process type associated with the first time period, the change being from the flexible feedback type to one of the feedback enabled type and the feedback disabled type; and
the one or more processors are configured to cause the apparatus to selectively providing output the feedback according to the one of the feedback enabled type and the feedback disabled type.

17. The apparatus of claim 14, wherein the one or more processors are further configured to cause the apparatus to obtain the configuration information via one of a system information block (SIB) and a radio resource control (RRC) message.

18. The apparatus of claim 14, wherein;
each time period of the set of time periods is associated with a corresponding index; and
the configuration information comprises the corresponding index for each time period of the set of time periods associated with their corresponding feedback process types.

19. The apparatus of claim 14, wherein the one or more processors are further configured to cause the apparatus to obtain the configuration information via one of a radio resource control (RRC) message and a medium access control (MAC) control element (CE).

20. The apparatus of claim 14, wherein the configuration information is specific to the apparatus and is dependent on at least one of a traffic requirement associated with the apparatus or a quality of service requirement associated with the apparatus.

21. The apparatus of claim 20, wherein;
the one or more processors are further configured to cause the apparatus to obtain a second configuration information for the set of time periods; and
a feedback process type indicated in the configuration information for the first time period overrides a conflicting feedback process type indicated in the second configuration information for the first time period.

22. The apparatus of claim 14, wherein the one or more processors are further configured to cause the apparatus to obtain a mapping of pattern indices to patterns of feedback process types as applied to a quantity of time periods.

23. The apparatus of claim 22, wherein the one or more processors are further configured to cause the apparatus to obtain the mapping via a radio resource control (RRC) message.

24. The apparatus of claim 22, wherein the quantity of time periods depends on a round-trip time between the apparatus and a network node.

25. The apparatus of claim 22, wherein:
the configuration information comprises a pattern index of the pattern indices;
the pattern of feedback process types corresponding to the pattern index is applied to the set of time periods; and
the configuration information is dependent on at least one of a traffic requirement of the apparatus or a quality of service requirement of the apparatus.

26. The apparatus of claim 25, wherein the one or more processors are further configured to cause the apparatus to obtain an action time indicating a time delay between receiving the configuration information and applying the configuration information.

27. The apparatus of claim 14, wherein the set of time periods comprise a set of downlink transmission occasions.

28. The apparatus of claim 14, further comprising at least one transceiver configured to:
receive configuration information for the set of time periods;
receive the downlink transmission; and
transmit the feedback, wherein the apparatus is configured as a user equipment.

29. An apparatus for wireless communication, comprising:
at least one memory comprising computer-executable instructions; and
one or more processors configured to execute the computer-executable instructions and cause the apparatus to:
output a configuration of a search space comprising available time and frequency resources, wherein:
the configuration indicates a feedback process type corresponding to at least one of:
the search space; or
an encoding of the DCI; and
the corresponding feedback process type comprises one of a feedback enabled type, a feedback disabled type, and a flexible feedback type;
output the DCI via the search space;
output a downlink transmission scheduled by the DCI; and
obtain feedback regarding decoding of the downlink transmission according to the feedback process type corresponding to at least on of:
the search space; or
the encoding of the DCI.

30. The apparatus of claim 29, wherein;
the configuration indicates the feedback process type for the encoding of the DCI;
the configuration further indicates a mapping between the encoding of the DCI and the feedback process type; and
the encoding of the DCI comprises at least one of a size of the DCI or a format of the DCI.

31. The apparatus of claim 29, wherein:
the configuration includes at least one field and
different values of the field indicate different feedback process types including the feedback enabled type, the feedback disabled type, and the flexible feedback type.

32. The apparatus of claim 29, further comprising at least one transceiver configured to:
transmit the configuration of the search space;
transmit the downlink control channel;
transmit the downlink transmission; and
receive the feedback, wherein the apparatus is configured as a network entity.

* * * * *